United States Patent
Ma et al.

(10) Patent No.: US 8,811,751 B1
(45) Date of Patent: Aug. 19, 2014

(54) METHOD AND SYSTEM FOR CORRECTING PROJECTIVE DISTORTIONS WITH ELIMINATION STEPS ON MULTIPLE LEVELS

(71) Applicants: Jianglin Ma, Louvain-la-Neuve (BE); Michel Dauw, Diegem (BE); Pierre De Muelenaere, Court-Saint-Etienne (BE); Olivier Dupont, Sombreffe (BE)

(72) Inventors: Jianglin Ma, Louvain-la-Neuve (BE); Michel Dauw, Diegem (BE); Pierre De Muelenaere, Court-Saint-Etienne (BE); Olivier Dupont, Sombreffe (BE)

(73) Assignee: I.R.I.S., Mont-Saint-Guibert (BE)

( * ) Notice: Subject to any disclaimer, the term of this patent is extended or adjusted under 35 U.S.C. 154(b) by 0 days.

(21) Appl. No.: 14/136,695

(22) Filed: Dec. 20, 2013

(51) Int. Cl.
*G06K 9/48* (2006.01)

(52) U.S. Cl.
USPC .......................................... 382/199; 382/275

(58) Field of Classification Search
None
See application file for complete search history.

(56) References Cited

U.S. PATENT DOCUMENTS

| | | | |
|---|---|---|---|
| 2003/0026482 A1* | 2/2003 | Dance | 382/199 |
| 2007/0076187 A1* | 4/2007 | Goris et al. | 356/4.03 |
| 2008/0226171 A1* | 9/2008 | Yin et al. | 382/174 |
| 2008/0260256 A1* | 10/2008 | Zeng et al. | 382/195 |
| 2009/0103808 A1* | 4/2009 | Dey et al. | 382/177 |
| 2010/0014782 A1* | 1/2010 | Fero et al. | 382/290 |
| 2010/0239165 A1* | 9/2010 | Wu et al. | 382/176 |
| 2013/0094764 A1* | 4/2013 | Campbell | 382/199 |

* cited by examiner

*Primary Examiner* — Jingge Wu
(74) *Attorney, Agent, or Firm* — Jerold I. Schneider; Schneider Rothman IP Law Group

(57) ABSTRACT

Method, system, device and computer program product for projective correction of an image containing at least one text portion that is distorted by perspective. The method includes the steps of image binarization, connected component analysis, horizontal vanishing point determination, vertical vanishing point determination and projective correction. The horizontal vanishing point is determined by estimating text baselines by means of position determining pixels of pixel blobs, identifying horizontal vanishing point candidates from the baselines, and determining a horizontal vanishing point from the candidates. The vertical vanishing point is determined on the basis of vertical features of the text portion. The method includes a first elimination step on the level of position determining pixels, a second elimination step on the level of text baselines and a third elimination step on the level of horizontal vanishing point candidates.

16 Claims, 18 Drawing Sheets

· de soja – deux propositions a l'aciaite pa
ns peine l'enthousiasme des enquêteurs (
lité – une saveur qui a décidément marqu

FIG. 10A

· de soja – deux propositions a l aciaite p — 1002
1004 — ns peine l entho      e des enqueteurs d — 1006
lite   une saveur qui a decidement

FIG. 10B

· de soja   deux propositions a l aciaite p
1008 — ns peine l entho – – – e des enqueteurs d
lite   une saveur qui a decidement

FIG. 10C ferred to the persona
application executed b
the function for pers
the shelf application,
flat-bed scanner, shee
document, may be us ⎯1102
   Meanwhile, since t
is incorporated in the
more expensive than c

FIG. 11

METHOD AND SYSTEM FOR CORRECTING PROJECTIVE DISTORTIONS WITH ELIMINATION STEPS ON MULTIPLE LEVELS

TECHNICAL FIELD

The present invention relates to a method, a system, a device and a computer program product, for correcting a projective distortion.

BACKGROUND ART

Digital cameras (hereinafter referred to as cameras) may be used for capturing images. With the advancement in technology, digital cameras are implemented in almost all types of digital devices. Examples of such digital devices include, but are not limited to, mobile communication device, a tablet, a laptop, and a Personal Digital Assistant (PDA). In many instances, the cameras may serve as an alternative for a document scanner as the cameras can be used to capture images of a document. The images of the document may have to be processed before text recognition and/or text extraction. Processing of the images of the document imposes two main challenges: poor image quality of the captured images due to unfavourable imaging conditions, and distortion in the captured images. The distortion may be due to the camera, and/or angle and positions of the camera relative to a plane of the document while capturing the images. The distortion due to the latter is known as projective distortion. In projective distortion, text symptoms or characters appear larger closer to the camera plane, and appear to decrease in size farther away. There are known techniques for improving the quality of the images. However, improving the quality of images may not aid in recognition and/or extraction of text when the images of the documents are, in particular, projective distorted. The projective distortion not only disturbs visual interpretation of the text but also affects accuracy of text recognition algorithms.

There are existing techniques for correcting the projective distortion. One of the currently known techniques for performing correction of projective distortion uses auxiliary data. The auxiliary data may include a combination of orientation measurement data, accelerometer data and distance measurement data. However, such auxiliary data may not be available in all the electronic devices due to lack of various sensors and/or processing capabilities. Some other techniques discuss manual correction of projective distortion. One such technique requires a user to manually identify and mark four corners of a quadrilateral that used to be a rectangle formulated by two horizontal line segments and two vertical line segments before the distortion. Another technique requires the user to identify and mark parallel lines that correspond to horizontal lines or vertical lines before the distortion. Based on the corners or parallel lines, correction of the projective distortion is performed. However, the manual correction of projective distortion is time-consuming, inefficient, and error-prone.

Techniques for automatic correction of projective distortions algorithms also exist. These techniques focus on identifying horizontal and vertical vanishing points. The vanishing points may refer to points where contours (for example, horizontal contours or vertical contours) of the document in the image converge to a point. The techniques use the horizontal and the vertical vanishing points to perform correction of projective distortion. However, most of the techniques require complicated manual parameter settings for the correction. If the content of the image changes, the parameters have to be changed manually. This limits the capability of the techniques. Further, the existing techniques are computationally expensive making it difficult to implement in small devices, such as, mobile communication devices. Furthermore, most of the techniques work on an assumption that the document images comprise only text. In case of the document images having a combination of text and pictures, the techniques may not produce useful results or results at all. Also, many of the techniques work on an assumption that the text in the images of document are formatted and/or positioned in a particular manner. So when the text in the images are not formatted and/or positioned in the particular manner, the techniques fail.

DISCLOSURE OF THE INVENTION

It is an aim of this invention to provide a method, system, device and/or computer program product for performing projective correction of a distorted image, which does not show at least one of the drawbacks mentioned above.

This aim is achieved according to the invention as defined in the independent claims.

According to a first aspect of the present invention, which may be combined with the other aspects described herein, a method for projective correction of an image containing at least one text portion that is distorted by perspective is disclosed. The method includes a step of image binarization, where said image is binarized. Subsequently, the method includes a step of performing connected component analysis. The connected component analysis involves detecting pixel blobs in said at least one text portion of said binarized image. Subsequently, the method includes a step of horizontal vanishing point determination. The horizontal vanishing point determination includes estimating text baselines by means of eigenpoints of said pixel blobs and determining a horizontal vanishing point of said at least one text portion by means of said text baselines. The method further includes a step of vertical vanishing point determination for said at least one text portion on the basis of vertical features thereof. The method further includes a step of projective correction, which involves correcting said perspective in said image on the basis of said horizontal and vertical vanishing points.

In embodiments according to the first aspect, a step of text and picture separation is performed after said image binarization and before said connected component analyses, and only textual information is kept.

In embodiments according to the first aspect, each eigenpoint may be the centre of the bottom of a bounding box of the respective pixel blob. The step of estimating text baselines may include the step of confusing eigenpoints elimination. The confusing eigenpoints may be detected which are out of line with respect to eigenpoints in the vicinity of the eigenpoint in consideration. The confusing eigenpoints may be disregarded for said text baseline estimation.

In embodiments according to the first aspect, the confusing eigenpoints elimination step may include determining the width and height of the pixel blobs, determining mean values for width and height of the pixel blobs, and detecting said confusing eigenpoints as eigenpoints belonging to pixel blobs of which at least one of the width and height of the pixel blob in consideration differs by a predetermined extent from said calculated mean values.

In embodiments according to the first aspect, the said step of estimating text baselines may include a step of clustering eigenpoints into eigenpoint groups. Said eigenpoint groups may fulfil at least one of the following conditions:

a point to point distance between the eigenpoints of the group is below a first distance threshold, a point to line distance between each eigenpoint of the group and a line formed by the eigenpoints of the group is below a second distance threshold, an off horizontal angle of the line formed by the eigenpoints of the group is below a maximum angle, and the eigenpoint group contains a minimum number of eigenpoints.

Said text baselines may be estimated based on said eigenpoint groups.

In embodiments according to the first aspect, said first distance threshold, said second distance threshold, said maximum angle and said minimum number of eigenpoints may be set adaptively based on content of the image. Said step of estimating text baselines may further include a step of eigenpoint group merging. The eigenpoint groups on both sides of a disregarded eigenpoint may be merged into a larger eigenpoint group.

In embodiments according to the first aspect, said step of determining the horizontal vanishing point may include the steps of defining each of said estimated text baselines as lines in a Cartesian coordinate system, transforming each of said text baselines defined in the Cartesian coordinate system to a data point in a homogenous coordinate system, and assigning a confidence level to each of the data points. Said confidence level may be based on at least the length of the respective text baseline and the proximity of the group of eigenpoints used for estimating the text baseline and the resulting text baseline.

In embodiments according to the first aspect, said step of determining the horizontal vanishing point may further include the steps of grouping a number of data points having a confidence level above a predetermined threshold into a priority sample array, clustering the data points in the priority sample array into a number of sample groups, assigning a group confidence value to each sample group on the basis of at least the confidence level assigned to each data point in the sample group and iteratively selecting sample groups of data points from the priority sample array for line fitting. Each sample group may include two or more data points. Said iteration may start with the sample group having the highest confidence value in the priority sample array.

In embodiments according to the first aspect, said step of determining the horizontal vanishing point may include the steps of performing line fitting for the first sample group resulting in a first fitted line and subsequently performing line fitting for each further sample group resulting in further fitted lines, determining on the basis of the first and further fitted lines a set of data points which are positioned below a predetermined distance threshold from the first fitted line, and estimating at least a first and a second horizontal vanishing point candidate from the horizontal text baselines corresponding to the determined set of data points.

In embodiments according to the first aspect, said step of determining the horizontal vanishing point may include the steps of performing projective correction on the basis of each estimated horizontal vanishing point candidate, comparing the proximity of each horizontal vanishing point candidate to the resulting horizontal text direction after projective correction, and selecting the horizontal vanishing point candidate which is closest to the horizontal text direction of the image document after projective correction.

In embodiments according to the first aspect, said step of determining the vertical vanishing point may include the steps of estimating a plurality of vertical text lines, each corresponding to the direction of a selected one of said pixel blobs, selected by a blob filtering algorithm on the text portion of the image, defining each of said estimated vertical text lines as lines in a Cartesian coordinate system, transforming each of said vertical text lines estimated in the Cartesian coordinate system to a data point in a homogenous coordinate system, and assigning a confidence level to each of the data points. Said confidence level may be based on at least the eccentricity of the shape of the pixel blob used to estimate the respective vertical text line.

In embodiments according to the first aspect, said step of determining the vertical vanishing point may include the steps of: grouping a number of data points having a confidence level above a predetermined threshold into a priority sample array, and clustering the data points in the priority sample array into a number of sample groups. Each sample group may include at least two data points. Said step of determining the vertical vanishing point comprises the steps of assigning a group confidence value to each sample group on the basis of the confidence level assigned to each data point in the sample group, and iteratively selecting sample groups of data points from the priority sample array for line fitting. Said iteration may start with the sample group having the highest group confidence value in the priority sample array.

In embodiments according to the first aspect, said step of determining the vertical vanishing point may include the steps of performing line fitting for the first sample group resulting in a first fitted line and subsequently performing line fitting for each further sample group resulting in further fitted lines, determining on the basis of the first and further fitted lines a set of data points which are positioned below a predetermined distance threshold from the first fitted line, and estimating at least a first and a second vertical vanishing point candidate from the vertical text lines corresponding to the determined set of data points.

In embodiments according to the first aspect, said step of determining the vertical vanishing point may include steps of performing projective correction on the basis of each estimated vertical vanishing point candidate, comparing the proximity of each estimated vertical vanishing point candidate to the resulting vertical text direction after projective correction, and selecting the vertical vanishing point candidate which is closest to the vertical text direction of the image document.

In embodiments according to the first aspect, said blob filtering algorithm may select pixel blobs based on one or more of the following conditions: the eccentricity of the shape of the considered pixel blob, which represents how elongated it is (the value is between 0 and 1; 0 and 1 are extremes: a blob whose eccentricity is 0 is actually a circular object, while a blob whose eccentricity is 1 is a line segment), is above a predetermined threshold, the proximity of each pixel blob to the border of the image is above a predetermined distance threshold, the angle of the resulting vertical line relative to the vertical direction is below a maximum angle threshold, and the area of each pixel blob defined by the number of pixels is below a maximum area threshold but above a minimum area threshold.

In embodiments according to the first aspect, said first and second vanishing point candidates may be estimated using different approximation methods chosen from the group consisting of a least squares method, a weighted least squares method and an adaptive least squares method.

In a first alternative aspect of the invention, which may be combined with the other aspects described herein, a method for projective correction of an image containing at least one text portion that is distorted by perspective is disclosed. The method comprises a step of image binarization, where said image is binarized, and a step of connected component analysis. The connected component analysis detects pixel blobs in said at least one text portion of said binarized image. For each of said pixel blobs a position determining pixel may be selected on a pixel blob baseline of the pixel blob. Said position determining pixel may define the position of the pixel blob in the binarized image. The method further includes a step of horizontal vanishing point determination. The horizontal vanishing point determination includes estimating text baselines by means of said position determining pixels and determining a horizontal vanishing point of said at least one text portion by means of said text baselines. The method further includes a vertical vanishing point determination. The vertical vanishing point is determined for said at least one text portion on the basis of vertical features thereof. The method further includes a step of projective correction, wherein the said perspective distortion in said image is corrected on the basis of said horizontal and vertical vanishing points.

In embodiments according to the first alternative aspect, a step of text and picture separation is performed after said image binarization and before said connected component analyses, and only textual information is kept.

In embodiments of the first alternative aspect, said position determining pixel as described may be the centre of the bottom of a bounding box of the pixel blob. Said position determining pixel may in alternative embodiments be a bottom corner (i.e. bottom left or right corner) of a bounding box of the pixel blob, or another pixel that determines the position of the pixel blob or a bounding box thereon.

In embodiments of the first or first alternative aspects, systems or devices may be provided comprising one or more processors and compatible software code portions configured for performing the above described methods or steps.

In embodiments of the first or first alternative aspects, non-transient storage media may be provided on which a computer program product is stored comprising software code portions in a format executable on a computer device and configured for performing the above described methods or steps when executed on said computer device. Said computer device may be any of the following devices: a personal computer, a portable computer, a laptop computer, a netbook computer, a tablet computer, a smartphone, a digital still camera, a video camera, a mobile communication device, a personal digital assistant, a scanner, a multi-function device or any other like computer device.

In a second aspect according to the invention, which may be combined with the other aspects described herein, a method for determining vanishing point candidates of a text portion in an image document that is distorted by perspective is described. The method includes steps of image binarization, where said image is binarized. Subsequently, the method includes performing connected component analysis, wherein pixel blobs are detected in said at least one text portion of said binarized image. A position determining pixel is selected for each of said pixel blobs on a pixel blob baseline of the pixel blob, said position determining pixel defining the position of the pixel blob in the binarized image. The method also includes estimating a number of text lines in a Cartesian coordinate system, each text line representing an approximation of a horizontal or vertical text direction of said text portion, on the basis of the position determining pixels. The method also includes transforming each of said text lines to a data point in a homogenous coordinate system. The method further includes assigning a confidence level to each of the data points. The method includes grouping a number of data points having a confidence level above a predetermined threshold into a priority sample array. The method includes clustering the data points in the priority sample array into a number of sample groups. Each sample group comprises two or more data points. The method further includes a step of assigning a group confidence value to each sample group on the basis of at least the confidence level assigned to each data point in the sample group. In addition, the method includes applying a RANSAC algorithm to determine among said data points a set of inliers with respect to a first fitted line. The RANSAC algorithm is initiated with the sample group having the highest group confidence value in the priority sample array. The method further includes a step of estimating at least one vanishing point candidate from the text lines corresponding to said set of inliers.

In embodiments according to the second aspect, a step of text and picture separation is performed after said image binarization and before said connected component analyses, and only textual information is kept.

In embodiments according to the second aspect, the confidence level that is assigned to said data points may be based on at least the length of the respective text line and the proximity of the position determining pixels to the respective text line.

In embodiments according to the second aspect, the RANSAC algorithm may include the following steps. First, iteratively selecting sample groups of data points from the priority sample array for line fitting. The iteration starts with the sample group having the highest group confidence value in the priority sample array. Next, performing line fitting for the first sample group resulting in a first fitted line and subsequently performing line fitting for each further sample group resulting in further fitted lines. Next, determining on the basis of the first and further fitted lines a set of data points which are positioned below a predetermined distance threshold from the first fitted line, said set of data points forming said set of inliers.

In embodiments according to the second aspect, the predetermined distance threshold from the first fitted line may be a fixed parameter. The predetermined distance threshold from the first fitted line may alternatively be adaptable based on content of the image document.

In embodiments according to the second aspect, at least a first and a second vanishing point candidate may be estimated from the text lines corresponding to said set of inliers. The first and second vanishing point candidates may be estimated using different approximation methods chosen from the group consisting of: a least squares method, a weighted least squares method and an adaptive least squares method. The method may then further include a step of selecting a vanishing point from the estimated vanishing point candidates. The selection may comprise the steps of: performing projective correction on the image document on the basis of each estimated vanishing point candidate, comparing the proximity of each vanishing point candidate to the resulting horizontal or vertical text direction after projective correction, and selecting the vanishing point candidate which is closest to the horizontal or vertical text direction of the image document after projective correction.

In embodiments according to the second aspect, the group confidence value of each sample group may be further based on the distances between the respective estimated text lines corresponding to the data points in the sample group. The confidence level of each of the data points may be further based on a dominant direction of the pixel blobs used for estimating each respective text line. The dominant direction may be defined by the eccentricity of the shape of each pixel blob. The maximum number of data points grouped into the priority sample array may be between 2 and 20, and more preferably between 5 and 10.

In embodiments according to the second aspect, the estimated text lines may be vertical text blob lines which each correspond to the direction of a selected one of said pixel blobs, selected by a blob filtering algorithm on the text portion of the image.

In embodiments of the second aspect, systems or devices may be provided comprising one or more processors and compatible software code portions configured for performing the above described methods or steps.

In embodiments of the second aspect, non-transient storage media may be provided on which a computer program product is stored comprising software code portions in a format executable on a computer device and configured for performing the above described methods or steps when executed on said computer device. Said computer device may be any of the following devices: a personal computer, a portable computer, a laptop computer, a netbook computer, a tablet computer, a smartphone, a digital still camera, a video camera, a mobile communication device, a personal digital assistant, a scanner, a multi-function device or any other like computer device.

In a third aspect of the invention, which may be combined with the other aspects described herein, a method for projective correction of an image containing at least one text portion that is distorted by perspective is disclosed. The method includes a step of image binarization, where said image is binarized. Subsequently, the method includes a step of performing connected component analysis. The connected component analysis involves detecting pixel blobs said at least one text portion of said binarized image. A position determining pixel is selected for each of said pixel blobs on a pixel blob baseline of the pixel blob. The position determining pixel defines the position of the pixel blob in the binarized image. The method includes a step of horizontal vanishing point determination. The horizontal vanishing point determination includes estimating text baselines by means of position determining pixels of said pixel blobs, identifying horizontal vanishing point candidates from said estimated text baselines, and determining a horizontal vanishing point of said at least one text portion by means of said horizontal vanishing point candidates. The method also includes a step of vertical vanishing point determination for said at least one text portion on the basis of vertical features thereof. The method further includes a step of projective correction. The projection correction involves correcting said perspective in said image on the basis of said horizontal and vertical vanishing points. The horizontal vanishing point determination may comprise a first elimination step on the level of eigenpoints, a second elimination step on the level of text baselines and a third elimination step on the level of horizontal vanishing point candidates.

In embodiments according to the third aspect, a step of text and picture separation is performed after said image binarization and before said connected component analyses, and only textual information is kept.

In embodiments according to the third aspect, the first elimination step includes a step of detecting confusing eigenpoints which are out of line with respect to eigenpoints in the vicinity of the eigenpoint in consideration. The said confusing eigenpoints may be disregarded for said text baseline estimation.

In embodiments according to the third aspect, said confusing eigenpoints elimination step may include determining the width and height of the pixel blobs, determining mean values for width and height of the pixel blobs, and detecting said confusing eigenpoints as eigenpoints belonging to pixel blobs of which at least one of the width and height of the pixel blob in consideration differs by a predetermined extent from said calculated mean values.

In embodiments according to the third aspect, said step of estimating text baselines includes a step of clustering eigenpoints into eigenpoint groups. Said eigenpoint groups may fulfil at least one of the following conditions:
- a point to point distance between the eigenpoints of the group is below a first distance threshold,
- a point to line distance between each eigenpoint of the group and a line formed by the eigenpoints of the group is below a second distance threshold,
- an off horizontal angle of the line formed by the eigenpoints of the group is below a maximum angle, and
- the eigenpoint group contains a minimum number of eigenpoints.

Said text baselines may then be estimated based on said eigenpoint groups.

In embodiments according to the third aspect, said first distance threshold, said second distance threshold, said maximum angle and said minimum number of eigenpoints may be set adaptively based on content of the image. Said step of estimating text baselines may further includes a step of eigenpoint group merging, in which the eigenpoint groups on both sides of a disregarded eigenpoint are merged into a larger eigenpoint group.

In embodiments according to the third aspect, the second elimination step includes the steps of: assigning confidence levels to said text baselines, and eliminating text baselines on the basis of said confidence levels. The confidence levels may be determined on the basis of at least the length of the respective text baseline and the proximity of the group of eigenpoints used for estimating the text baseline and the resulting text baseline. The elimination of text baselines may be performed by means of a RANSAC algorithm in which said confidence levels are taken into account.

In embodiments according to the third aspect, the third elimination step includes performing projective correction on the basis of each identified horizontal vanishing point candidate, comparing the proximity of each horizontal vanishing point candidate to the resulting horizontal text direction after projective correction, and selecting the horizontal vanishing point candidate which is closest to the horizontal text direction of the image document after projective correction.

In embodiments according to the third aspect, a first and a second horizontal vanishing point candidate may be estimated from said text baselines after said second elimination step. For said estimation of said first and second horizontal vanishing point candidates different approximation methods may be used, chosen from the group consisting of: a least squares method, a weighted least squares method and an adaptive least squares method.

In embodiments of the third aspect, systems or devices may be provided comprising one or more processors and compatible software code portions configured for performing the above described methods or steps.

In embodiments of the third aspect, non-transient storage media may be provided on which a computer program product is stored comprising software code portions in a format executable on a computer device and configured for performing the above described methods or steps when executed on said computer device. Said computer device may be any of the following devices: a personal computer, a portable computer, a laptop computer, a netbook computer, a tablet computer, a smartphone, a digital still camera, a video camera, a mobile communication device, a personal digital assistant, a scanner, a multi-function device or any other like computer device.

BRIEF DESCRIPTION OF THE DRAWINGS

The invention will be further elucidated by means of the following description and the appended drawings.

FIG. 9A shows a captured image, according to an embodiment of the present disclosure.

FIG. 9B shows an improved image as a result of projective correction, according to an embodiment of the present disclosure.

FIG. 10A shows an example image for which eigenpoints for text are identified, according to an embodiment of the present disclosure.

FIG. 10B shows an example image having over-classified eigenpoints groups, according to an embodiment of the present disclosure.

FIG. 10C shows an example image having consolidated eigenpoints groups, according to an embodiment of the present disclosure.

FIG. 11 shows an example portion of text for which baselines are estimated, according to an embodiment of the present disclosure.

MODES FOR CARRYING OUT THE INVENTION

Figure 1:
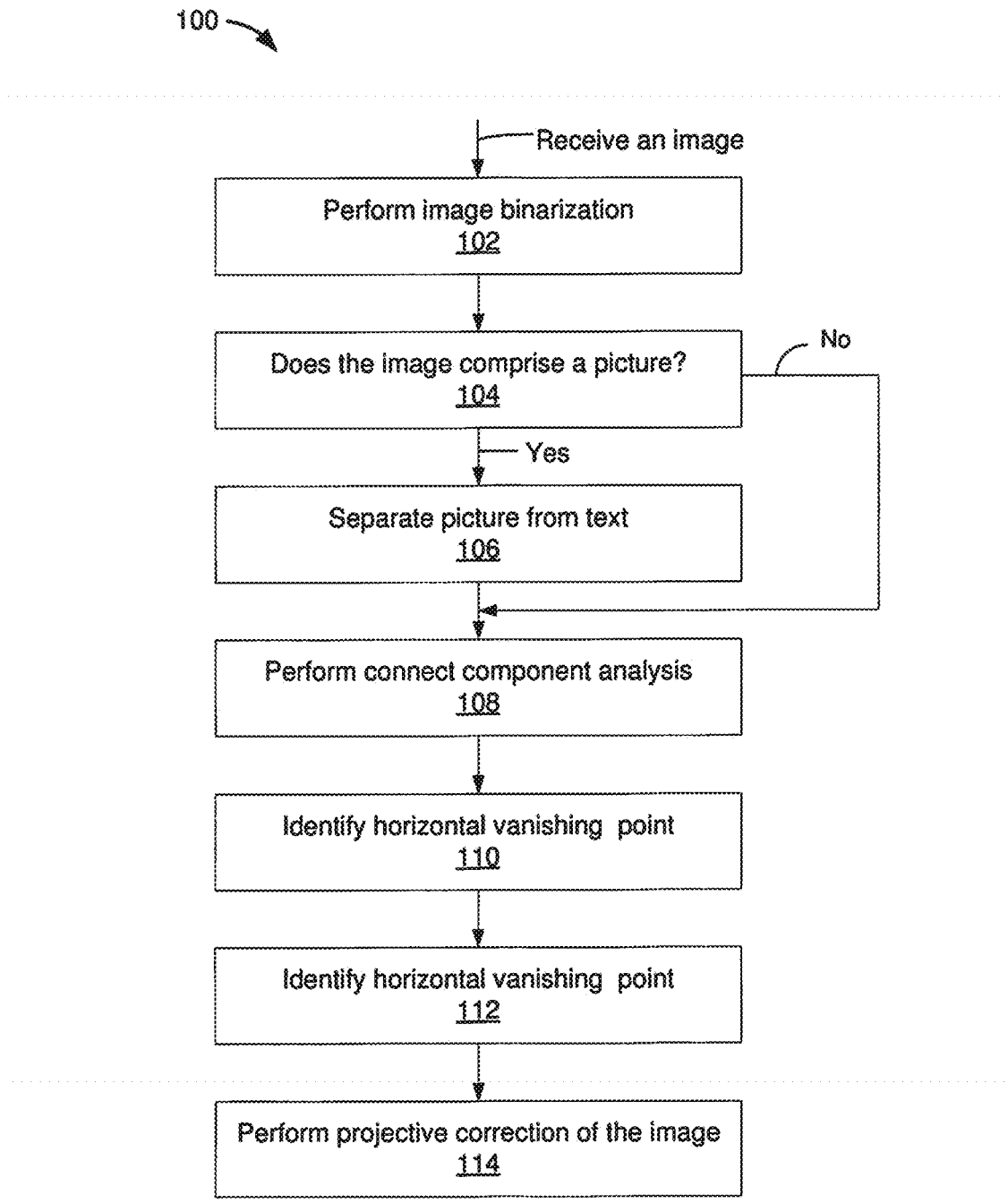
FIG. 1 shows a process flow for projective correction of a distorted image is described, according to an embodiment of the present disclosure.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Referring to FIG. 1; a process flow 100 for projective correction of a distorted image is described. The image may be received for projective correction. The image may be optionally examined to determine the quality of the image. Examining the image may include checking for presence of noise, illumination condition, clarity of characters, resolution, and the like. If the quality of the image is above a predetermined threshold, the image may be processed in step 102. If the quality of the image is below the predetermined threshold, the image may be preprocessed to improve quality of the image. Preprocessing may include involve modifying colour hue, correcting brightness imbalances, sharpness adjustments, eliminating noise, eliminating/correcting motion blur, compensating for camera misfocus, and the like, for restoring and improving the resolution of the image. In one example implementation, the preprocessing may be performed automatically. In another example implementation, toolbox options may be provided to a user to choose a type of preprocessing for the image. In one embodiment, preprocessing may be implemented using known techniques that include, but are not limited to, various image filtering methods such as Gaussian filtering and median filtering, Wiener filtering, Bilateral filtering, Wiener deconvolution, Total Variation deconvolution, Contrast-limited adaptive histogram equalization, and the like.

In step 102, image binarization is performed. Image binarization may include converting pixel values of the received image to either logical one (1) or logical zero (0). These values may be represented by a single bit or by more than one bit, for example, as 8-bit unsigned integers. The pixels of the received image may be grayscale pixels, color pixels or pixels represented in any other form. The values may be represented by corresponding black colour or white colour. In one embodiment, binarization may be performed using any of the known techniques that may be broadly classified into global approaches, region-based approaches, local approaches, hybrid approaches, or any variations thereof. In one example implementation, the image binarization is performed using Sauvola binarization. In this technique, binarization is performed on the basis of small image patches. Upon analysing statistics of the local image patch, a binarization threshold is determined using the following formula:

$$T_{th} = m * \left[1 + k\left(\frac{s}{R} - 1\right)\right] \quad [1]$$

where, m and s are local mean and standard deviation, respectively, R is the maximum value of the standard deviation; and k is the parameter controlling the threshold value. The parameter k may be chosen depending upon the document image. In one embodiment, k may be set manually. In another embodiment, the parameter k may be set automatically depending upon text characteristics of the document image.

Figure 6A:
FIG. 6A shows an example binarized image having a picture along with the text, according to an embodiment of the present disclosure.
Figure 6B:
FIG. 6B shows a resultant image after filtering the picture from the text, according to an embodiment of the present disclosure.

In step 104, it is determined whether the binarized image (hereinafter referred to as image) includes any pictures. If the image does not include any pictures, the process proceeds to step 108. If the image includes one or more pictures, the one or more pictures are separated from the text, in step 106. Any of known techniques such as page analysis methods, text location methods, machine learning methods, and/or the like may be used for separating the one or more pictures from the text. The techniques based on the page analysis methods may be used for images that are created from scanned documents or that appear substantially similar to scanned document images. The techniques based on the text location methods may be used for images having a complex background, such as having a picture in the background. The techniques based on the machine learning methods may be used for any type of images. The techniques based on the machine learning methods may require training samples for learning. In an example implementation for separating the one or more pictures from the text, a background of the document image is extracted. Using the background, the document image is normalized to compensate effects of uneven illustration. Thereafter, non-text objects are removed from the binary image using the heuristic filtering, in which heuristic rules are based upon area, relative size, proximity to image frame, density, average contrast, edge contrast and the like. FIG. 6A illustrates an example binarized image including a picture along with the text. FIG. 6B illustrate the resultant image after eliminating the picture.

Figure 7:
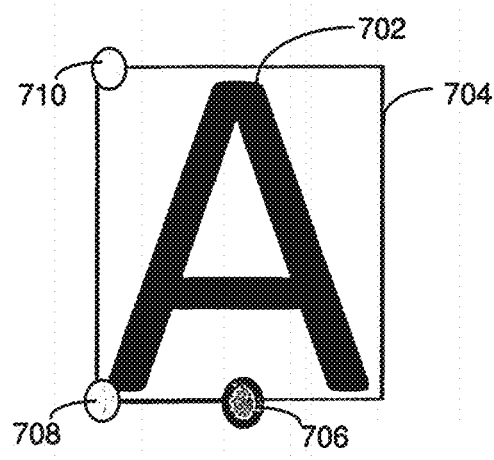
FIG. 7 shows an example pixel blob, according to an embodiment of the present disclosure.

In step 108, connected component analysis is performed on the binarized image having only textual information. The connected component analysis may involve identifying and labelling connected pixel components in the binary image. Pixel blobs may be identified during the connected component analysis. A pixel blob may be a region having a set of connected components in which some properties, such as, colour, are constant or vary within a predefined range. For example, the word 'Hello' has five different sets of connected components, that is, each character of the word is a connected component or a pixel blob. A position determining pixel is identified for each of the pixel blobs. A position determining pixel defines a position of the pixel blob in the binary image. In one embodiment, the position determining pixel may be an eigenpoint. The eigenpoint may be a pixel at centre of the pixel blob baseline within the pixel blob. In another embodiment, the position determining pixel may a pixel at left end or right end of the pixel blob baseline within the pixel blob. Other embodiments having the position determining pixel at different locations in the pixel blob or a bounding box drawn on the pixel blob are contemplated within the scope of this disclosure. FIG. 7A illustrates an example pixel blob 702. The bounding box 704 is formed around the connected component or pixel blob 702. In FIG. 7A, the connected component identified is the character 'A' 702. The bounding box 704 has an eigenpoint 706, which may be defined as the centre of the bottom of the bounding box 704. The eigenpoint 706 may be one of the position determining pixels used herein. Other position determining pixels may also be used in projective correction. For example, position determining pixels 708 and 710 represent bottom-left end position determining pixel and top-left end position determining pixel. The position determining pixels may be used to estimate one or more horizontal and/or vertical text lines in the binarized image. Each text line represents an approximation of a horizontal or vertical text direction of associated text portion.

In step 110 a horizontal vanishing point is determined. In one embodiment, the horizontal vanishing point may be determined using text baselines determined using the position determining pixels. Various embodiments for determining the horizontal vanishing point are described in conjunction with FIG. 2.

In step 112, a vertical vanishing point is determined. In one embodiment, the vertical vanishing point is determined using margin lines identified using the position determining pixels. In another embodiment, the vertical vanishing point may be determined using vertical stroke features of the connected components. In yet another embodiment, the vertical vanishing point is identified using the margin lines and the vertical stroke features. Various embodiments for determining the vertical vanishing point are described in conjunction with FIGS. 3 and 4.

In step 114, using the horizontal vanishing point and the vertical vanishing point, the projective correction of the image is performed. The projective correction is performed based on estimation of eight unknown parameters of a projective transform model. An exemplary projective transform model is provided below.

$$H = \begin{bmatrix} h_{11} & h_{12} & h_{13} \\ h_{21} & h_{22} & h_{23} \\ h_{31} & h_{32} & 1 \end{bmatrix} \quad [2]$$

In one embodiment, a horizontal projective transform matrix and a vertical projective transform matrix are constructed to estimate parameters of projective transform model. The horizontal projective transform matrix and the vertical projective transform matrix are constructed using an equation provided below.

$$F = T^{-1}KRT \begin{bmatrix} 1 & 0 & -t_x \\ 0 & 1 & -t_y \\ 0 & 0 & 1 \end{bmatrix} \begin{bmatrix} \cos\theta & \sin\theta & 0 \\ -\sin\theta & \cos\theta & 0 \\ 0 & 0 & 1 \end{bmatrix} \begin{bmatrix} 1 & 0 & 0 \\ 0 & 1 & 0 \\ \dfrac{-1}{v_x - t_x} & 0 & 1 \end{bmatrix} \quad [3]$$

where $(v_x, v_y)$ is the vanishing point, (w, h) is the width and height of the document image, $$t_x = -w/2, \; t_y = -h/2, \; \theta = \arctan\left(\frac{v_y - t_y}{v_x - x}\right).$$

Using the projective matrix, the projective correction of the image is performed.

In another embodiment, the vertical vanishing point and horizontal vanishing point may be used to identify corners of the original distorted image $(x_i, y_i)$ ($4 \leq i \leq 1$) and their corresponding locations in the undistorted or registered document image $(X_i, Y_i)$ ($4 \leq i \leq 1$). Based on the four pairs of corresponding corners, a projective transform model can be estimated. The projective transform model may be estimated using an equation $$\begin{bmatrix} x_1 & y_1 & 1 & 0 & 0 & 0 & -X_1 x_1 & -X_1 x_1 \\ 0 & 0 & 0 & x_1 & y_1 & 1 & -Y_1 y_1 & -X_1 x_1 \\ & & & & \cdots & & & \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} X_1 \\ Y_1 \\ \cdots \end{bmatrix} \quad [4]$$

Figure 8:
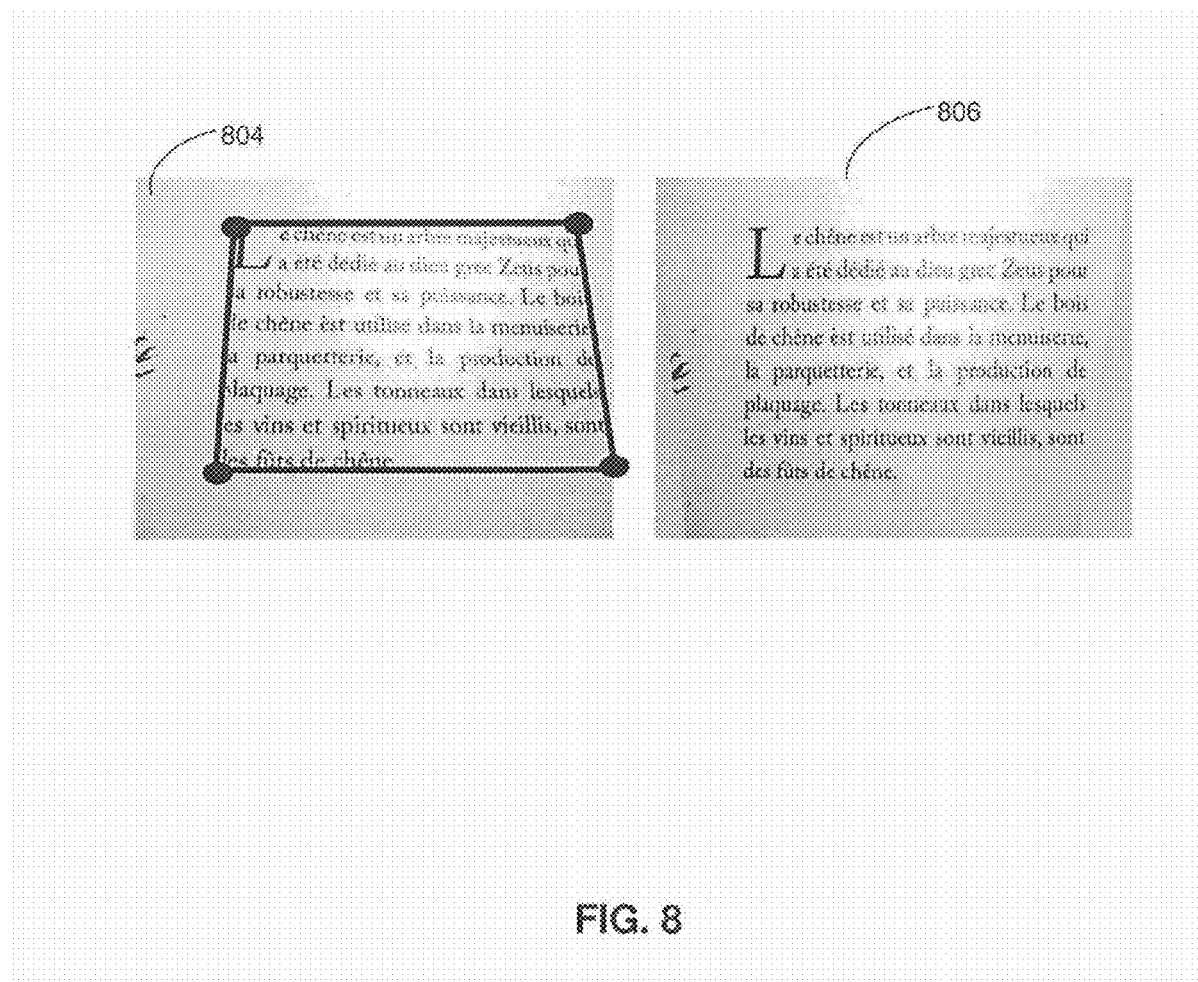
FIG. 8 shows a presentation grid for a user to adjust the corners of the image, according to an embodiment of the present disclosure.
Figures 9A, 9B:
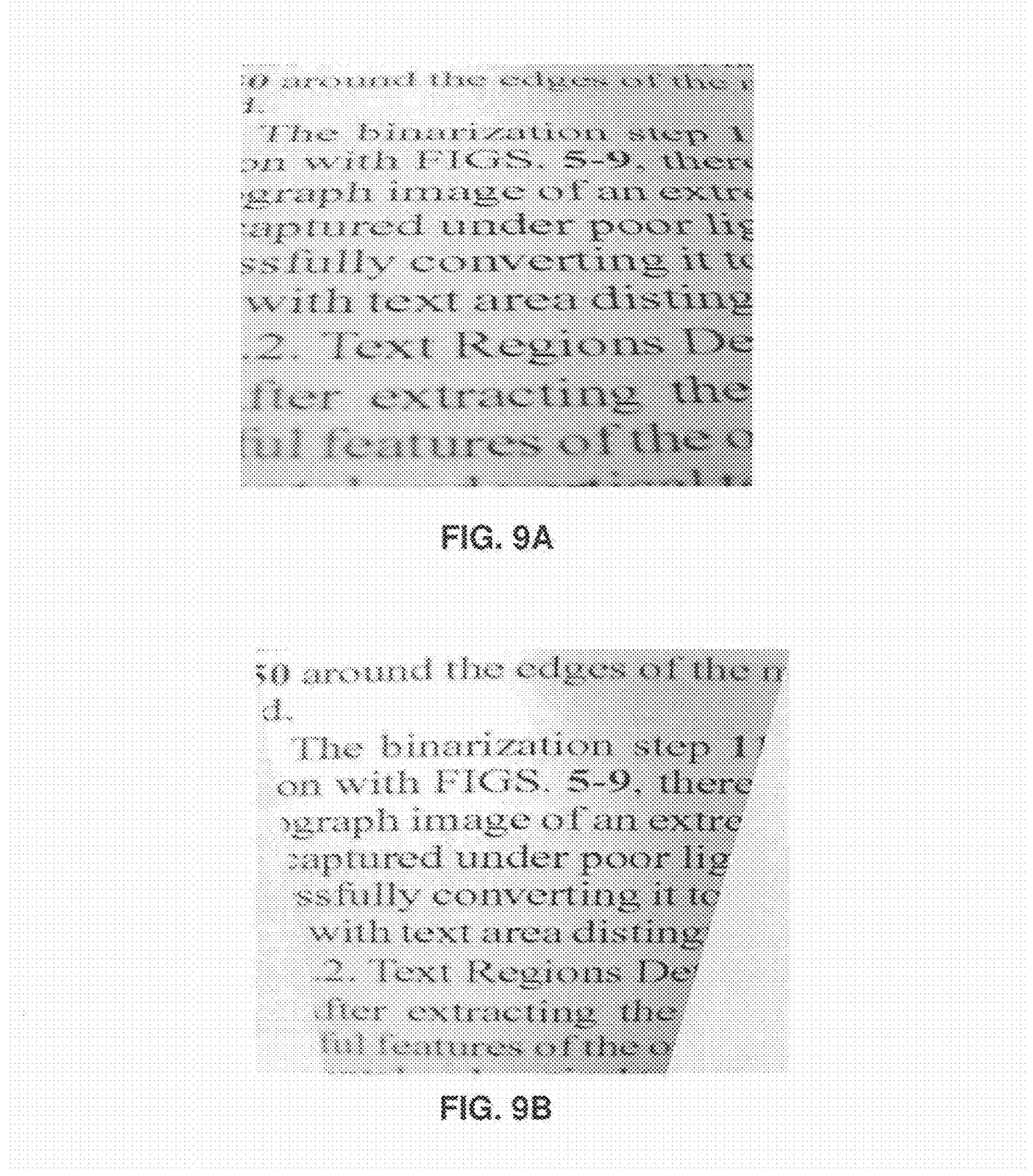

Eight parameters may be obtained by using (4), subsequent to identifying the four corners in the projectively corrected image. Subsequent to building the projective transform model, a general trend of projective correction may be generated and displayed for user review as illustrated in FIG. 8. The user may be provided with an option to accept the general trend, or tools to adjust the four corners. For example, as illustrated in FIG. 8, a graphical user interface element 804 may be provided with possibility for the user to adjust the corners. In response to change in corners as per user input, the projective transform model may be modified, and corresponding projective correction may be performed. In response to acceptance without changes, the projective correction may be performed. The resultant image may be presented as illustrated in element 806 of FIG. 8. A person skilled in the art will appreciate that suitable additional options may also be provided to the user. An example of resultant of projective correction is illustrated in FIGS. 9A and 9B. FIG. 9A illustrates a captured image. FIG. 9B illustrates image after projective correction.

Figure 2:
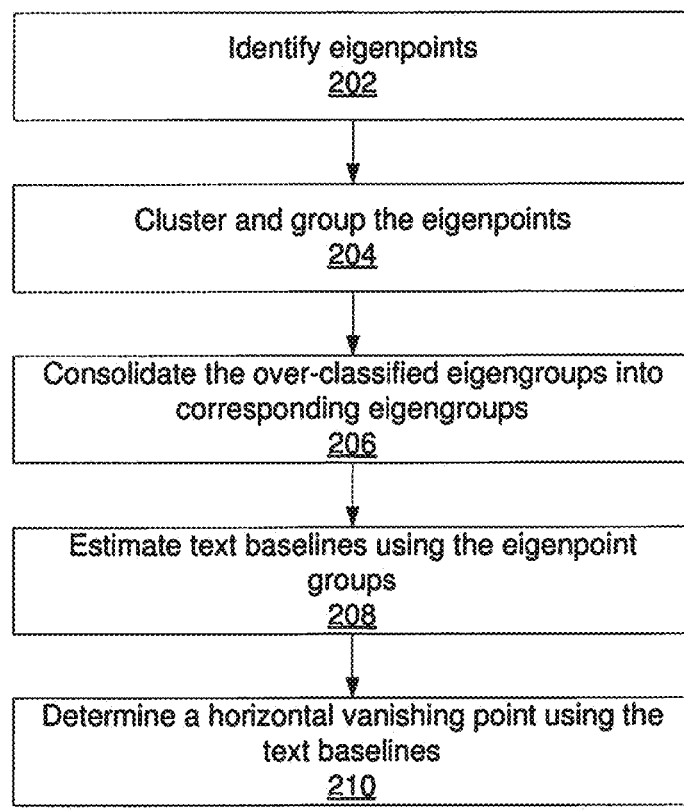
FIG. 2 shows a process flow for identifying a horizontal vanishing point, according to an embodiment of the present disclosure.

FIG. 2 discusses an example method 200 for identifying the horizontal vanishing point, according to one embodiment. In step 202, the eigenpoints may be identified. The eigenpoints may be identified through the connected component analysis of the image. The eigenpoints are defined for all pixel blobs. In step 204, the eigenpoints are clustered and grouped. In one embodiment, the eigenpoints may be processed prior to being clustered. The eigenpoints processing may include eliminating confusing eigenpoints. The confusing eigenpoints may be eigenpoints that are either above or below a text baseline. The confusing eigenpoints may be predominantly from three sets of characters: the first set includes characters that may be composed of two blobs, wherein the smaller blob is above the text baseline, such as, "j", "i" and the like; the second set includes characters that extend below the text baselines when printed, such as, "p", "q" and "g"; and the third includes characters, such as, comma (,), hyphen (-) and the like. The confusing eigenpoints associated with the first and the third set of characters may be identified based on size of the pixel blobs. The size of the pixel blobs associated with the first set and the third set of characters may be significantly smaller, either horizontally or vertically, in comparison to other characters. Thus, the confusing eigenpoints may be identified by comparing the size of the pixel blobs with the mean values for all the pixel blobs. In one example implementation, width and height of all pixel blobs are computed. Further, mean values for the width ($m_w$) and the height ($m_h$) of the pixel blobs are computed. Eigenpoints belonging to the pixel blobs whose width and/or height deviates from said calculated mean values by a predetermined extent are marked as confusing eigenpoints. In one example instance, the eigenpoints having width beyond the range of [0.3, 5]*$m_w$ and/or height beyond the range of [0.3, 5]*$m_h$ are identified as the confusing eigenpoints. Such confusing eigenpoints may be discarded from further processing.

The remaining eigenpoints are classified and clustered into different eigenpoint groups such that each eigenpoint group includes eigenpoints from the same text line. An example eigenpoint clustering algorithm is described in FIG. 3. The eigenpoint clustering algorithm is based on an assumption that eigenpoints of the same group typically fulfil one or more of the following conditions: (1) these eigenpoints are close to each other; (2) these eigenpoints form a substantially straight line; and (3) the direction of the constructed line is close to the horizontal direction. In an embodiment, these conditions are translated to respective constraints in the eigenpoint clustering algorithm such that an eigenpoint is assigned to a specific eigenpoint group if at least one of following conditions is satisfied: a point to point distance between this eigenpoint and other eigenpoints of the group is below a first distance threshold $T_d$; a point to line distance between this eigenpoint and a line formed by the eigenpoints of the group is below a second distance threshold $T_l$; and an off horizontal angle of the line formed by the eigenpoints of the group is below a maximum angle $T_a$. Further, to make the eigenpoint clustering algorithm more robust, an additional constraint may be added such that the eigenpoint group comprises at least a minimum number of eigenpoints $T_m$.

In one embodiment, the constraints of the eigenpoints clustering algorithm, i.e., point to point distance threshold $T_d$, point to line distance threshold $T_l$, maximum angle off the horizontal direction threshold $T_a$ and minimum number of eigenpoints $T_m$ in a eigenpoint group may be set adaptively based on an analysis of the image, e.g. the analysis of camera document images. In an alternate embodiment, the parameters may be set manually. The $T_a$ with respect of the horizontal direction may be offset to about 20 degrees; Tm may be about 10 assuming having at least 2 or 3 words in the text. It should be understood that other values may be selected for $T_a$ and Tm. The values of $T_d$ and $T_l$ may depend upon the content of the text in the document image. For example, if the character size is large $T_d$ then $T_l$ may be kept higher and vice versa. In one embodiment, $T_d$ and $T_l$ may be calculated adaptively as follows. A median distance $D_c$ based on all the shortest distance between neighbouring characters in a word is calculated. $T_l$ may be set to $D_c$ and $T_d$ may be set to be 3*Dc. These values are chosen such that $T_d$ is large enough to search neighbouring letters and words in the same paragraph, while avoiding words belonging to neighbouring paragraphs in the horizontal direction from being considered to be in the same eigenpoint group. Setting $T_d$ large enough to search neighbouring letters and words in the same paragraph would enable identification of paragraph margin line between the paragraph and the horizontal neighbouring paragraph. In some example instances, the spaces between the words in a single line might cause over-classification of eigenpoints in a line into more than one eigenpoint group. The over-classification may be due to some small or large connected components that may have been removed during the eigenpoints elimination procedure causing a large gap between the words.

In step 206, the over-classified eigenpoints groups are consolidated by merging into corresponding groups. An exemplary eigenpoints merging algorithm may be described as follows. For each eigenpoint group $\{C_i\}$ (n>=i>=1), left and right end eigenpoint $l_i$ and $r_i$ (n>=i>=1), respectively, may be identified. The pixel blob that may correspond to the rightmost eigenpoint of the eigenpoint group is identified. Right neighbouring pixel blobs of the rightmost eigenpoint are searched among discarded pixel blobs (for example, pixel blobs corresponding to the confusing eigenpoints). In response to identifying the right neighbouring blob, the right neighbouring blob may be set as the new right end point $r_i$. The step of searching for a further right neighbouring pixel blobs of the new right end point as described in previous step may be repeated until no further right neighbouring blob is found. In response to absence of the right neighbouring blob, eigenpoint coordinate of the blob as $r\_new_i$ is recorded. With a new array of right end points $r\_new_i$ (n>=i>=1), a searching index k is initialized to zero (0). The searching index may be increased by 1: k=k+1, and distance between $l_k$ and $r\_new_i$ (n>=i>=1) may be calculated. The eigenpoint groups corresponding to the pair of points $l_k$ and $r\_new_i$ ($\{C_k\}$ and $\{C_i\}$) may be merged if they meet at least one of the following conditions: distance between the eigenpoint groups is within a predetermined distance (in one example implementation, distance may be less than 0.5*(Td)); and lines corresponding to the eigenpoint groups are close to each other (for example, the line distance is less than ($T_i$)). If the eigenpoint groups are merged, the number of eigenpoint groups may be reduced by one: n=n-1. A check may be performed to determine if the searching index is equal to the number of point groups (k==n). If the searching index is not equal, then the search index is increased, and the previous steps of calculating the distance, eigenpoint group merging are performed if they meet the abovementioned defined condition. FIG. 10A illustrates an example image before eigenpoints classification. FIG. 10A illustrates eigenpoints for the pixel blobs at the text baseline. FIG. 10B illustrates an example image after classification of eigenpoints into groups. The figure illustrates image having group in each of the text line. For example, the first text line illustrates an eigenpoint group 1002. The second text line illustrated in the image shows over-classified eigenpoints groups 1004 and 1006. The over-classified groups 1004 and 1006 (two groups) may be seen in second line of the text of FIG. 10B (indicated by square and round symbols for corresponding eigenpoint groups). FIG. 10C illustrates an example image having consolidated eigenpoints groups. The over-classified groups 1004 and 1006 of second line as illustrated in FIG. 10B are consolidated into one eigenpoint group 1008 (indicated by plus marks).

In step 208, text baselines are estimated using the grouped eigenpoints resulting after the clustering and merging steps. In one embodiment, the text baselines are estimated using a method (hereinafter, referred to as a priori line estimation) based upon adaptive weighted line estimation. The a priori line estimation may assign weighting factors to each eigenpoint involved in line estimation. Consider a scenario where n eigenpoints: p1, p2, ... pn are used for line estimation ax+by+c=0 (or y=kx+t). Each of the eigenpoint may be assigned a weighting factor w1, w2, ... wn. In this case, the line estimation may be considered equivalent of a minimization problem which is defined by:

$$\min_{k,t} \sum_{i=1}^{n} w_i(y_i - (kx_i + t))^2 \qquad [5]$$

The minimum of the sum of squares in equation [5] may be found by setting gradient to zero. Since model contains two (2) parameters, there are two (2) gradient equations. Minimization of the above equation may be performed using the following example pseudo-codes:
function line=weighted_least_squre_for_line(x,y,weighting);
part1=sum(weighting.*x.*y)*sum(weighting(:));
part2=sum((weighting.*x))*sum((weighting.*y));
part3=sum(x.^2.*weighting)*sum(weighting(:));
part4=sum(weighting.*x).^2;
beta=(part1−part2)/(part3−part4);
alpha=(sum(weighting.*y)-beta*sum(weighting.*x))/sum (weighting);
a=beta;
c=alpha;
b=−1;
line=[a b c];
A weighting factor to each eigenpoint may be assigned using a weighting function:

$$w_i = \exp(-dis_i) \qquad [6]$$

where $dis_i$ is defined as the distance between the eigenpoint and an expected text baseline. Thus, the eigenpoint may be assigned a higher weighing factor if the eigenpoint is nearer to the expected text baseline and vice versa. An iterative procedure may be used to approach closer to the expected text baseline. In one example implementation, the iterations may be performed for a predetermined number of rounds (for example, about 10-70 rounds) or till the difference between two successive line angles are below a small threshold (for example, about 0.01 degrees).

The estimated lines may be further refined by eliminating outliers in the eigenpoint group. The outliers may be identified, for example, using a Gaussian model. According to the Gaussian model, most eigenpoints (for example, about 99.7%) may be located within three standard deviations. Therefore, if an eigenpoint is located beyond three standard deviations, the eigenpoint may be considered as an outlier. The remaining eigenpoints in the point group may then be used for line estimation with the conventional least square method. The aforesaid a priori line estimation may be performed for all the eigenpoint groups. FIG. 11 illustrates an example portion of text for which baselines are estimated. It can be seen that the eigenpoint groups are illustrated as connected by a line. An example line is highlighted within 1102.

In step 210, the horizontal vanishing point may be identified using the estimated text baselines. According to homogeneous coordinate theory, each horizontal line in the Cartesian coordinate system may be regarded as a data point in the homogeneous space and a line that passes through these data points corresponds to a vanishing point. Thus, horizontal vanishing point identification can be regarded as a line fitting problem in the homogeneous coordinate system.

Although the estimated text baselines are carefully estimated, some text baselines may contribute to outliers from the perspective of vanishing point estimation. Such outlier data points may be eliminated to improve estimation of the horizontal vanishing point. The outliers may be obtained due to inaccurate line estimation, non-text components (for example, in cases where text and picture separation fails), distortions, and the like. To overcome this problem, in accordance with one embodiment, a method based upon the conventional Random Sample Consensus (RANSAC) algorithm as described in Martin A. Fischler and Robert C. Bolles "Random Sample Consensus: A Paradigm for Model Fitting with Applications to Image Analysis and Automated Cartography". Comm. of the ACM 24 (6): 381-395, June 1981, is used for the horizontal vanishing point identification. The RANSAC-based algorithm is selected due to its robustness in eliminating outliers when estimating model parameters. The proposed RANSAC-based algorithm differs from the conventional RANSAC algorithm in a way that initial data points are selected for model parameter estimation and that confidence levels may be taken along. Unlike random selection of the initial data points in the conventional RANSAC algorithm, the proposed RANSAC-based algorithm selects initial samples that have largest confidence.

An example implementation of the proposed RANSAC-based algorithm is now described below.

In one embodiment, each of the estimated text baselines may be defined in a Cartesian coordinate system. Each of the text baselines defined in the Cartesian coordinate system may be transformed to a data point in a homogenous coordinate system.

Confidence levels for each of the data points may be assigned. The confidence levels for the data points may be determined based on proximity of the eigenpoints used for estimating the text baseline to the resulting text baseline, and the length of the respective text baseline. The confidence level for each horizontal text baseline may be defined as:

$$C_i = \frac{\text{abs}(s_i - s_{max} - s_{min})}{s_{max}} * \frac{l_i}{l_{max}}; (n >= i >= 1) \quad [7]$$

where $s_{max}$ and $s_{min}$ represent the maximum and minimum standard deviation of all n line segments; $l_{max}$ represents the longest line segment among all n lines. Thus, a longer horizontal text baseline is assigned a higher confidence level. This is based upon an assumption that the longer the horizontal text baseline, the better is the estimate of the horizontal text baseline. Similarly, the lower the standard deviation (indicative of the proximity of the eigenpoints to the corresponding estimated text baseline), the better is the text baseline estimate. Consequently, such text baselines are assigned higher confidence levels. The data points in the sample points having confidence levels above a predetermined threshold may be grouped into a priority sample array. The data points in the priority sample array may be clustered into a number of sample groups. In one embodiment, each sample group may include two or more data points. For line estimation, the accuracy may also be determined by the distance of the data points that are used for estimating the line. If two data points are far away from each other, then there is higher confidence that the line estimation would be accurate. Therefore, a second confidence level indictor may be assigned to the pair of points in the sample group:

$$CD_{j,k} = \frac{Dis_{j,k}}{Dis_{max}} m >= j >= 1, m >= k >= 1, j \neq k \quad [8]$$

where $Dis_{j,k}$ is the distance between line j and line k in the vertical direction and $Dis_{max}$ is the maximum distance among the m*(m−1) pairs of lines. A selection of m (m<<n) lines may be considered for formulating the priority sample groups to select the first m lines that have the best confidence levels. Each sample group may be assigned a group confidence value on a basis of at least the confidence level assigned to each data point in the sample group.

In step A, the sample groups of data points may be iteratively selected from the priority sample array for line fitting. The iteration may be started with the sample group having the highest confidence value in the priority sample array. (if the iteration times exceeds a certain threshold then it can be stopped and the algorithm moves to step F). In step B, the line fitting may be performed for the first sample group resulting in a first fitted line and subsequently performing line fitting for each further sample group resulting in further fitted lines.

In step C, a set of data points which are positioned below a predetermined distance threshold from the first fitted line may be determined on the basis of the first and further fitted lines. These data points are termed as inliers. The predetermined distance threshold from the first fitted line may be a fixed parameter or may be set adaptively based upon content of the document image. In step D, the count of data points that are positioned below a predetermined distance threshold from the first fitted line is calculated. The maximum inliers number determined are recorded. In step E, a check may be performed to determine whether the maximum inlier number is equal to the number of data points. If the maximum inlier number is not equal to the number of data points, the iteration times may be recalculated and Step A may be reinitiated. If the maximum inlier number is equal to the number of data points, step F may be initiated.

In step F, the maximum inliers may be used to estimate the vanishing points. In one embodiment, first and a second horizontal vanishing point candidates may be estimated using different approximation methods chosen from the group consisting of a least squares method, a weighted least squares method and/or an adaptive least squares method. The use of other approximation methods is also contemplated herein. In step G, the horizontal vanishing point candidate may be selected which is closest to the horizontal text direction of the image document after projective correction. The horizontal text direction closeness may be measured by:

$$H\text{Closeness}_p = \sum_{i=1}^{n} \min(\alpha_i, 180 - \alpha_i)(m >= p >= 1) \quad [9]$$

where n is the number of horizontal lines in the document image, αi is defined as the angle of the ith line angle with respect to the horizontal direction (180°≥αi≥0°) after projective correction is performed, and p is the index of the pth candidate horizontal vanishing point selected from the m candidate vanishing points.

The conventional RANSAC algorithm uses randomly selected points for initial line estimation. Consequently, there may be different results each time the conventional RANSAC algorithm is executed. Moreover, it may be difficult to judge the results of the conventional RANSAC algorithm. The proposed RANSAC-based algorithm deals with this problem by incorporating some priori knowledge about the points. In the proposed RANSAC-based algorithm, points that have good confidence levels are selected first to estimate the inliers. Consequently, the proposed RANSAC-based algorithm provides more consistent results.

Although the disclosure describes using eigenpoints for horizontal vanishing point determination, it should be appreciated that other position determining pixels of the pixel blob can also be used for the horizontal vanishing point determination.

Figure 3A:
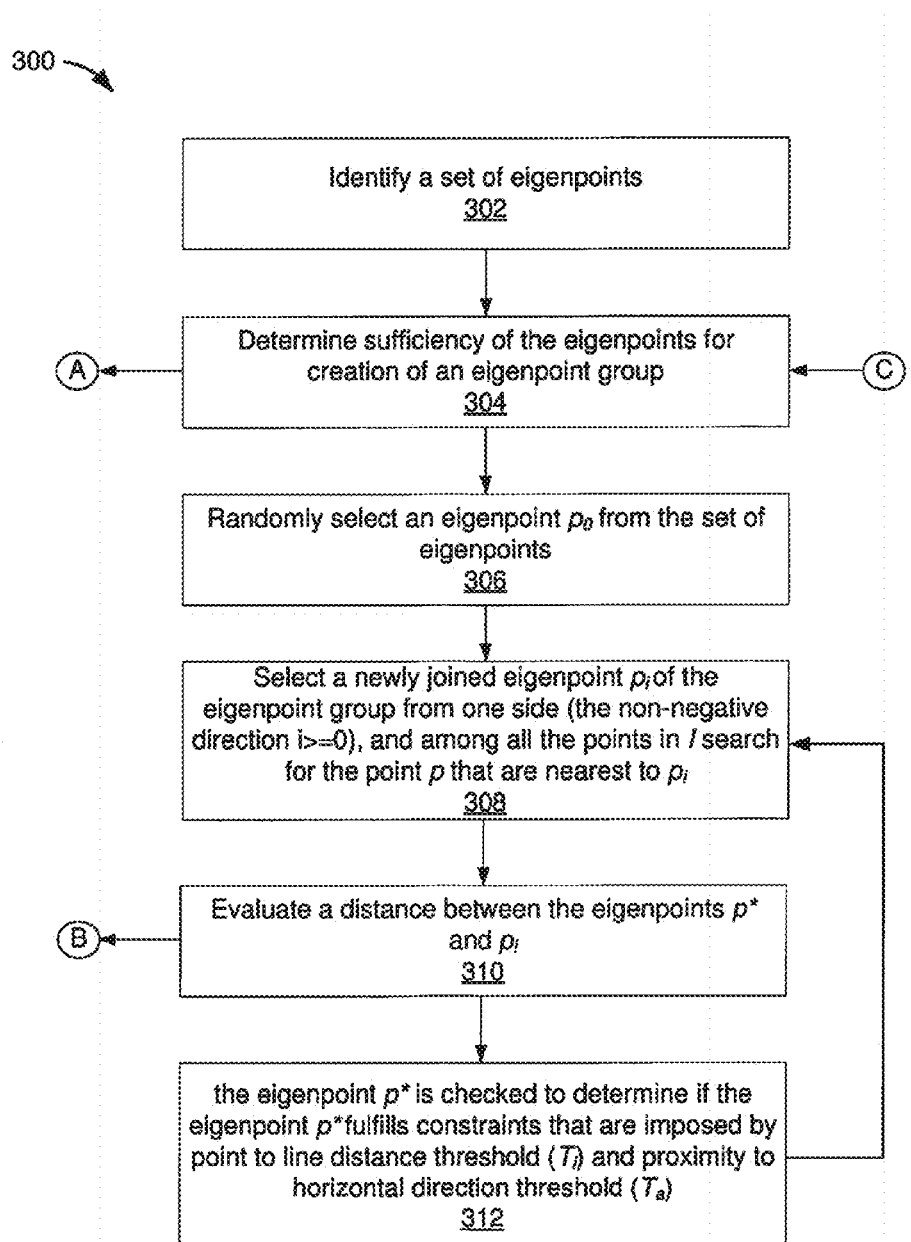
FIGS. 3A and 3B which may together be referred to as FIG. 3 in the specification, shows an eigenpoint clustering algorithm, according to an embodiment of the present disclosure.
Figure 3B:
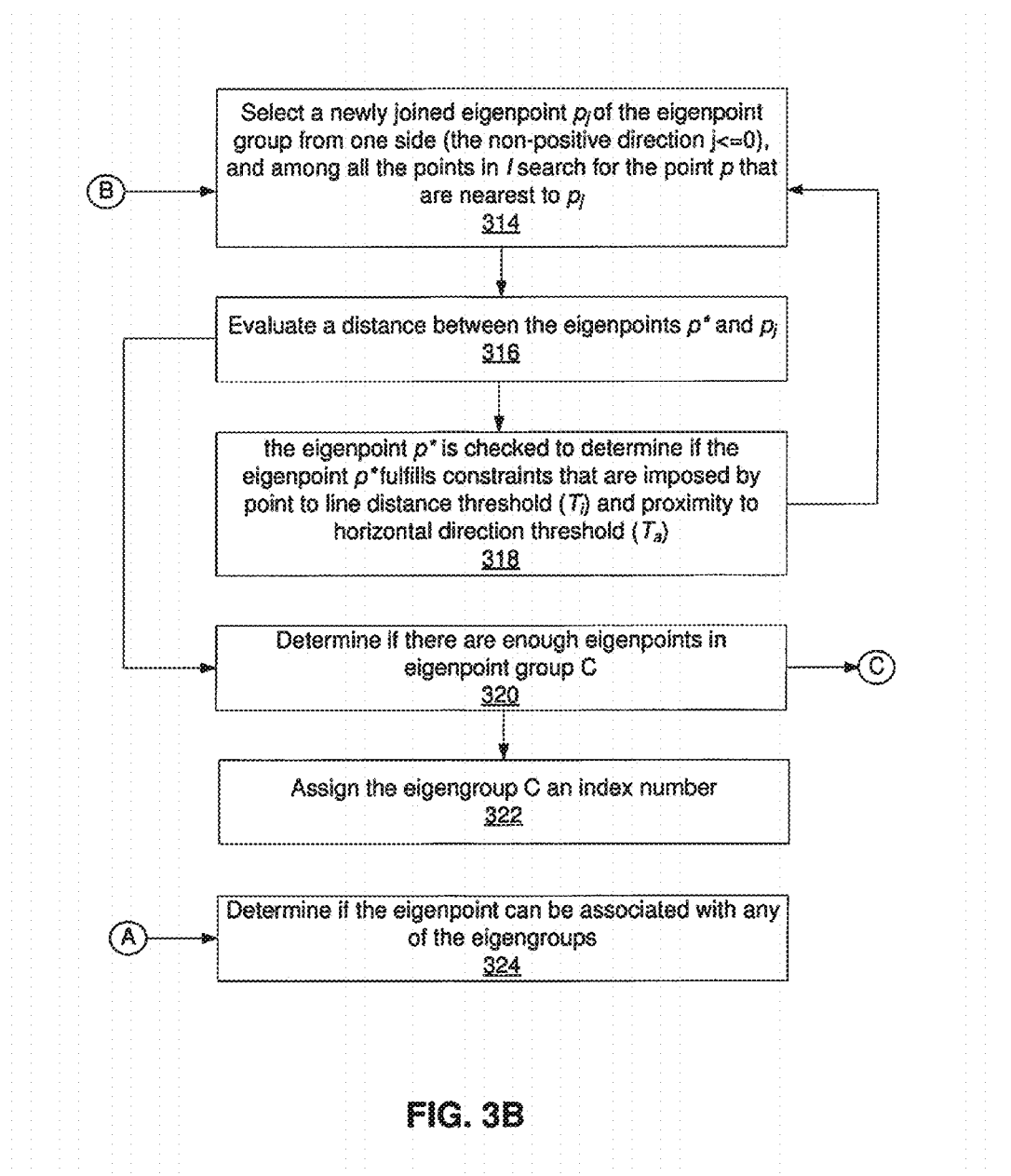

FIG. 3 describes an example eigenpoint clustering algorithm 300, according to one embodiment. In step 302, a set of eigenpoints "l" may be identified. In step 304, the eigenpoints may be counted to determine if the number is sufficient for creating an eigenpoint group. If the number is above a sufficient (at least above a threshold number ($T_M$)), the set of eigenpoints "l" may be processed. The threshold number may be set as a constraint for creation of the eigenpoint group. If the number of eigenpoints is less than a threshold, then step 324 may be performed. In one example implementation, the threshold number of eigenpoints may be 10 suggesting presence of at least 2 or 3 words in a single line. The threshold may be set to prevent a possibility of assigning unrelated eigenpoints to the eigenpoint group.

In step 306, an eigenpoint (for example, $p_0$) is randomly selected from the set of the eigenpoints l. The eigenpoint $p_0$ may be input as a first eigenpoint in a candidate line group 'C'. In one embodiment, the candidate line group C may be a bidirectional queue. Further, the eigenpoint $p_0$ is removed from the set of eigenpoint l. The eigenpoints from one side of the $p_0$ are input into the candidate line group C.

In step 308, the newly joined eigenpoint $p_i$ from the candidate eigenpoint group C is selected from one side of the bidirectional queue (for example, the queue in the non-negative direction i>=0). An eigenpoint p* from the set of eigenpoints I that is nearest to the eigenpoint $p_i$ is identified.

In step 310, the distance between the eigenpoint $p_i$ and p' is computed. If the distance is below the threshold distance ($T_d$), step 312 is performed. If the distance is above the threshold distance ($T_d$), step 314 is performed. The threshold distance may refer to a maximum distance between the eigenpoints to be within a group. In one example implementation, the threshold distance between the eigenpoints of the group is below a first distance threshold may be 3 times of the median distance of nearest set of neighbouring eigenpoints.

In step 312, it is determined whether the selected eigenpoint p* fulfils constraints imposed by point to line distance threshold ($T_l$) and proximity to horizontal direction threshold ($T_a$). The point to line distance threshold ($T_l$) may define the maximum distance threshold of the point from the text baseline for an eigenpoint to be selected for the eigenpoint group. The point to line distance threshold ($T_l$) is used to select the eigenpoints that contribute in formulating a straight line. The proximity to horizontal direction threshold ($T_a$) may define the maximum angle of the eigenpoint from the line with respect to the horizontal direction for the eigenpoint to be selected for the eigenpoint group. The proximity to horizontal direction threshold ($T_a$) is used to select the eigenpoints that contribute in formulation of direction of the line close to a horizontal direction. In one example implementation, the $T_a$ may be twenty (20) degrees. In response to determining that the selected eigenpoint p' fulfils the constraints, the eigenpoint p' may be selected for the candidate line group C as the $p_{i+1}$ point in the bidirectional queue (in the non-negative direction) and i=i+1 in the meantime. In response to determining that the selected eigenpoint p' does not fulfil the constraints, it may be placed in a special line group "L".

The process steps of 308 to 312 are performed until all the eigenpoints from the one side (the non-negative direction of the bidirectional queue) are evaluated. In response to completion of evaluation of the one side of the eigenpoints, the remaining eigenpoints from the other side of the $p_0$ are considered (the non-positive direction of the bidirectional queue). The remaining eigenpoints from the other side of the $p_0$ are input into the candidate line group C.

In step 314, an eigenpoint $p_j$ (the non-positive direction of the bidirectional queue, j<=0) from the candidate line group C is selected from another side. An eigenpoint p* from the set of eigenpoints l, that is nearest to the eigenpoint $p_j$ from the other side in the eigenpoint group C is identified. In step 316, the distance between the eigenpoints $p_j$ and p is computed. If the distance is below $T_d$, step 618 is performed. If the distance is above $T_d$, step 320 is performed.

In step 318, the eigenpoint $p_j$ is checked to determine if the selected eigenpoint p* fulfils constraints with respect to $T_l$ and $T_a$. In response to determining that the eigenpoint fulfils the constraints, the eigenpoint p* may be selected for the candidate line group C as the $p_{j-1}$ point in the bidirectional queue (in the non-positive direction), and j=j-1 in the meantime. In response to determining that the eigenpoint does not fulfil the constraints, the eigenpoint $p_j$ may be placed in a special line group "L".

The process steps of 316 to 318 are performed until all the eigenpoints from the other side are evaluated.

In step 320, the eigenpoints in the candidate line group C may be counted to determine if the number is above a threshold number $T_m$. If the number is above $T_m$, step 322 is performed. If the number is below the $T_m$, the process is mapped to step 304 to determine if there are any other eigenpoints for processing. In step 322, the candidate line group C is assigned an index number so that the candidate line group C becomes an eigenpoints array for a line indexed by the index number.

In step 324, for each eigenpoint in the special line group L, it is checked whether the eigenpoint is within the constraints of $T_m$, $T_l$ and $T_a$ for any of the line groups. In response to determining that the eigenpoint is within the constraints $T_m$, $T_l$ and $T_a$, the eigenpoint is merged into the corresponding line group.

The process is repeated for every text baselines until all the lines in the document image are processed.

One advantage of the eigenpoints clustering algorithm as described herein is that it gives consistent clustering result regardless of the initial points for clustering. The use of the bidirectional queue allows usage of two end points on a line rather than one end point at one direction, thereby reducing the algorithm's reliance on the seeding point to formulate the point group. The eigenpoints clustering algorithm is flexible in a sense that the algorithm does not require that each eigenpoint must belong to one of the point groups. Some eigenpoints that do not fall in any of the groups are discarded or ignored. This results in easier and faster convergence of the proposed eigenpoint clustering algorithm than conventional clustering algorithms. Nevertheless the use of conventional or any other clustering algorithms for clustering the eigenpoints into different line groups are also contemplated herein.

Figure 4:
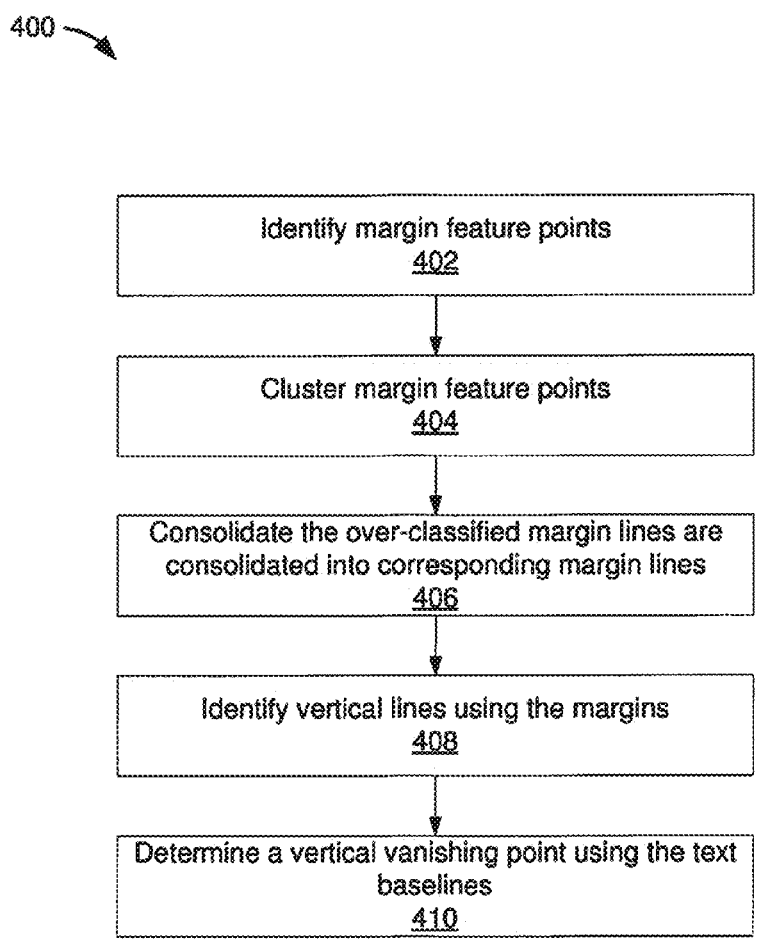
FIG. 4 shows a process flow for identifying a vertical vanishing point using position determining pixels, according to an embodiment of the present disclosure.
Figure 12:
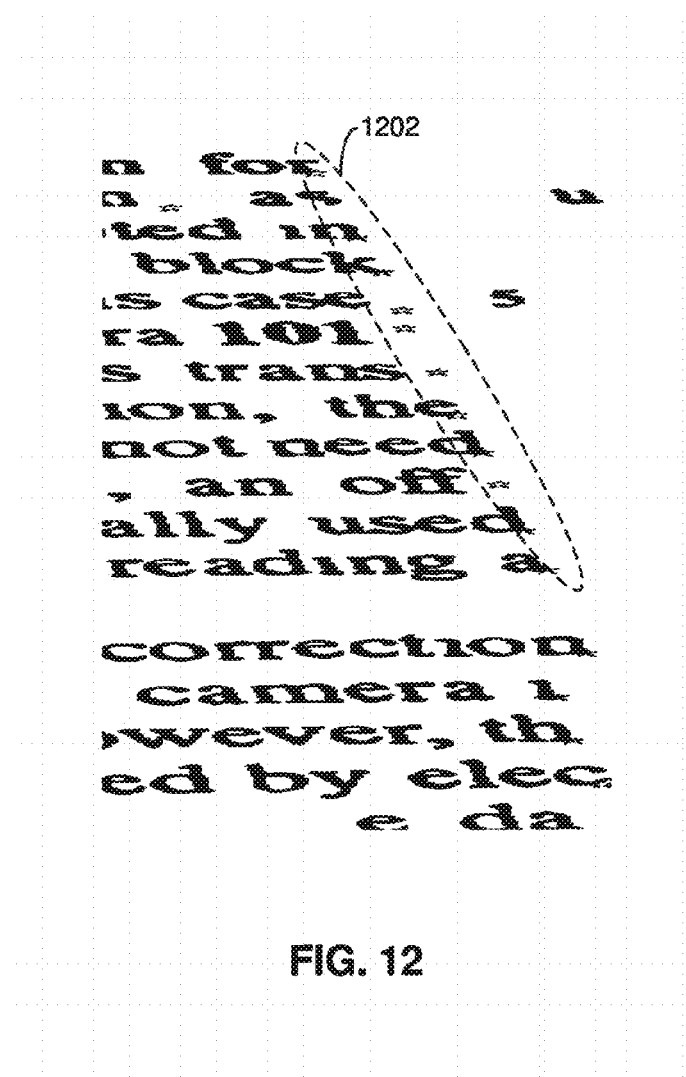
FIG. 12 shows an example image with margin feature points identified at the margin, according to an embodiment of the present disclosure.

FIG. 4 describes an example process flow 400 for identifying the vertical vanishing point using margin feature points, according to one embodiment. In step 402, the margin feature points may be identified. The margin feature points may be position determining pixels, according to one embodiment. The margin feature points may be identified as described below. In one embodiment, the margin feature points may be a bottom-left end pixel of the pixel blobs for the left margin, and the margin feature points may be a bottom-right end pixel of the pixel blob for the right margin. The bottom-left end points may be identified by finding a blob associated with the left eigenpoint in eigenpoint groups (for example identified during horizontal line estimation). The eigenpoints groups determined after eigenpoints merging step and prior to the usage of the eigenpoint groups for horizontal line formulations may be used for margin point determination. The reason being after eigenpoints merging left or right eigenpoint may correspond to the margining blob. Also, no eigenpoint may have been removed just prior to the line formulation. The left eigenpoint may be found after comparing the x-coordinate of the eigenpoints in the group. The corresponding blob of the left eigenpoint may be found. The bottom-left end point of the blob may be used as left margin feature point. Similar to bottom-left end point, bottom-right end points may be identified by finding a blob associated with the right eigenpoint in eigenpoint groups. After identifying the blob on the right end of the eigenpoints group, it may be determined whether there are neighbouring blobs near the identified right end blob. A blob searching is then performed using a process similar to the process used in neighbouring blob searching algorithm in the eigenpoint merging procedure. The bottom-right end points corresponding to the found blobs are then used to formulate the feature points for right margin line estimation. In alternate embodiments, other variations of the margin feature points may be used. FIG. 12 illustrates an example image with margin feature points identified at the margin. It can be seen that margin feature points are marked by dots at the margin as illustrated within 1202. The paragraph margins are usually vertical and parallel if no projective distortion occurs.

In step 404, margin point features are clustered into different margin groups. The margin feature points along margin lines of the document in the image may be used for estimating margins. In one embodiment, the margin feature points may be clustered based on proximity of the pixel blobs in corresponding margins. In one example embodiment, a clustering algorithm similar to the eigenpoint clustering algorithm described in conjunction with FIG. 3 may be used for clustering the margin feature points. In an alternate embodiment, a different end point clustering algorithm may be used such as described below.

Step 1: Set the margin point feature distance threshold $TEnd_{th}$, and all the left margin points identified (at step 402) are denoted as $\{P_t\}$;

Step 2: Initialize the left margin point group $\{C_1\}$ with a randomly selected one point from $\{P_t\}$, remove this point from $\{P_t\}$, set group_index=1;

Step 3: for each point in $\{P_t\}$, calculate minimum distance between this point and the points in $\{C_i\}$ (group_index≤i≤1). If the distance is lower than $TEnd_{th}$, then this point will be assigned to the point group that reach the minimum distance; otherwise the group index will increase by 1: group_index=group_index+1, and this point will be assigned to the newest left margin point group: $\{Cgroup\_index\}$.

$TEnd_{th}$ is set to be equal to 6*(Td) ((Td) is the median distance between eigenpoints as discussed previously in conjunction with FIG. 2), and this value may be selected such that it is sufficient enough to search for the neighbouring margin point features that are expected to be in the same margin line. The left end point clustering method may be different from the eigenpoints clustering method for horizontal line estimation, as the left end point clustering method may use all margin points, while in eigenpoints clustering algorithm some eigenpoints may be eliminated during the clustering process.

In alternate embodiments, other clustering algorithms may also be used. The clustered position determining pixels identified at the margins may be processed into different margin point groups. For example, if there are two columns in a document image, the position determining pixels for left margins and right margins of both the columns are identified and correspondingly grouped. In step 406, over-classified margin lines may be consolidated with corresponding margin lines. For example, two or more lines along the same margin may be consolidated into a single margin.

In step 408, vertical line estimation may be performed using the margin point groups. Similar to the eigenpoint clustering algorithm, not every margin point group may be used for vertical line estimation. The margin feature pixel for the group may have to satisfy one or more of the following conditions for qualifying for the margin line estimation: a minimum point number in the margin line $P_{th}$ (for example, the threshold for $P_{th}$ may be 3 eigenpoints), minimum percentage of points on the margin line $P_l$ (for example, about 50%), maximum angle of a line with respect of the vertical direction $\alpha_v$ (for example, the maximum angle may be about) 20°, and minimum non-border point confidence level $P_b$ (for example, the minimum non-border point may be about 50%).

The margin point feature (which contributes to $P_{th}$) may be regarded as within the margin line if the distance between the pixel determining point and the margin line is within a threshold ($T_l$), which, in an example implementation, is equal to the median eigenpoints distance ($T_d$). The percentage of points on margin line $P_l$ may be defined as the ratio between the number of eigenpoints within the margin line and the number of margin point feature in the clustered eigenpoint group. In some embodiments, there may be pixel determining points that are out of range. For example, when the document content is partially captured, border of the image may have content that are half captured. Pixel determining points associated with such blobs at the borders may be defined as border points. The border points may not be used in margin line estimation, and the percentage of non-border points can be defined as the ratio between the number of non-border points and the number of margin point features in the clustered margin point feature group. Minimum non-border point confidence level $P_b$ is defined as the multiplication of the percentage of points on margin line and the percentage of non-border point.

In one embodiment, the vertical line estimation may be performed using perpendicular offset least square method, though alternative methods are also contemplated here. Suppose a potential nearly vertical line is expressed as y=kx+t. With the perpendicular offset least square method, the optimal line coefficients correspond to the following object minimization function:

$$\min = \sum_{i=1}^{n} \left( \frac{|y_i - kx_i - t|}{\sqrt{1+k^2}} \right)^2 \qquad [10]$$

Based on perpendicular offset least square method, an iterative robust method for nearly vertical line estimation as described below, may be employed in accordance with one embodiment.

In step 1, a line is initialized using the perpendicular offset line estimation method. In step 2, the distance from sample points is calculated. In step 3, the line function may be recalculated based on the weighted perpendicular offset method. In step 4, the angle difference between the successive estimated lines may be calculated. If the angle difference is below a predefined threshold or the iteration count exceeds the maximum allowable iterations, the method proceeds to step 5. If the angle difference is above the predefined threshold or if the iteration count is within the maximum allowable iterations, next iteration is performed by proceeding to step 2. In step 5, the line function is calculated. The predefined threshold and the maximum allowable iterations time are the same values as the respective parameters in the horizontal line estimation method, according to one embodiment. Alternatively, different values are used for the predefined threshold and the maximum allowable iterations for the vertical line estimation than the ones used for the horizontal line estimation. The weighted perpendicular offset method can be implemented using the following example pseudo-codes:

```
function line=estimate_line_ver_weighted(pt_x, pt_y, w);
% pt_x x coordinate
% pt_y y coordinate
% w weighting factor
pt_x=pt_x(:);
pt_y=pt_y(:);
w=w(:);
% step 1: calculate n
n=sum(w(:));
% step 2: calculate weighted coordinates
y_square=pt_y(:).*pt_y(:);
x_square=pt_x(:).*pt_x(:);
x_square_weighted=x_square.*w;
y_square_weighted=y_square.*w;
x_weighted=pt_x.*w;
y_weighted=pt_y.*w;
% step 3: calculate the formula
B_upleft=sum(y_square_weighted)-sum(y_weighted).^2/n;
B_upright=sum(x_square_weighted)-sum(x_weighted).^2/n;
B_down=sum(x_weighted(:))*sum(y_weighted(:))/n-sum(x_weighted.*pt_y);
B=0.5*(B_upleft-B_upright)/B_down;
% step 4: calculate b
if B<0
b=-B+sqrt(B.^2+1);
else
b=-B-sqrt(B.^2+1);
end
% Step 5: calculate a
a=(sum(y_weighted)-b*sum(x_weighted))/n;
% Step 6: the model is y=a+bx, and now we transform the model to
% a*x+b*y+c=0;
c_=a;
a_=b;
b_=-1;
```

In another embodiment, the vertical line estimation may be performed using an x-y changeable weighted least square method. In the x-y changeable weighted least square method the coordinate of x and y may be exchanged before estimation of the vertical line so that the vertical offset will be constrained during the vertical line estimation.

Figure 13:
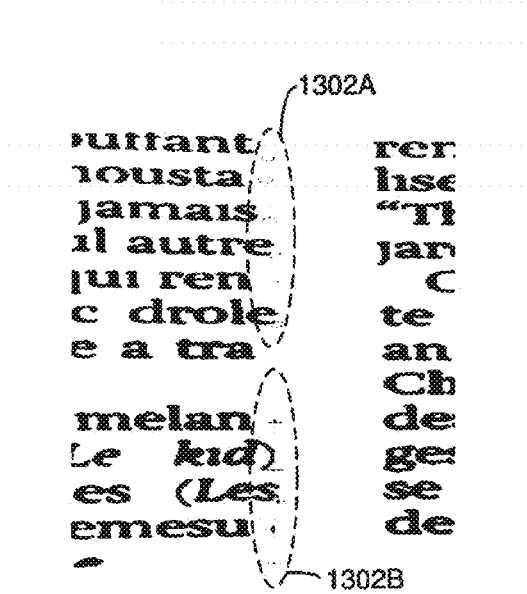
FIG. 13 shows an example image having two estimated vertical lines along a same margin, according to an embodiment of the present disclosure.
Figure 14:
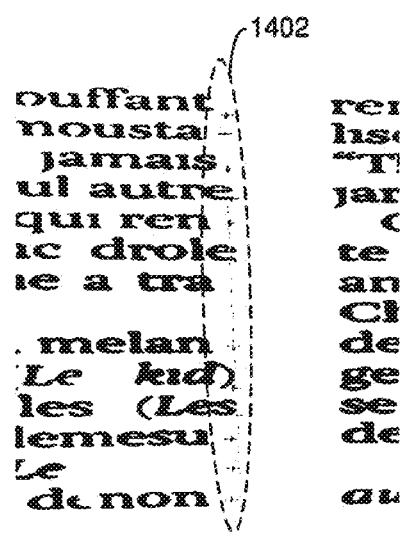
FIG. 14 shows an example image illustrating merging of the estimated vertical lines, according to an embodiment of the present disclosure.

Once the vertical lines are estimated, the vertical lines may be merged. For example, multiple broken margin lines along a line space may be merged to form a single margin. The vertical lines may be merged using the following steps. In step 1, for each margin line, x-coordinate may be calculated keeping vertical coordinate (y-coordinate) is fixed. In step 2, the distance of x-coordinates may be calculated for the margin lines. If the distance of the x-coordinates is less than a threshold $T_{vth}$, the margin lines may be merged. $T_{vth}$ may be chosen to be $2*(T_d)$, where the $T_d$ may be the median distance between margin feature points. In instances when there are multiple vertical lines, closest vertical lines may be merged before they are used for vertical vanishing point identification. FIG. 13 illustrates an example image showing two estimated vertical lines 1302A and 1302B along the same margin. FIG. 14 illustrates an example image showing merging of the estimated vertical lines into a single margin 1402 of FIG. 13.

In step 410, using the estimated vertical lines, the vertical vanishing point may be identified. The determined vertical lines may be processed using a modified RANSAC algorithm as described below, which is very similar to the method used for horizontal vanishing point identification. The estimated vertical margin lines resulting from the merging step may be defined in a Cartesian coordinate system. Further, each of said estimated vertical margin lines are transformed from the Cartesian coordinate system to a data point in a homogenous coordinate system. A confidence level to each of the data points may be assigned based on proximity of the margin points used for estimating the resulting margin lines as well as the length of the respective margin lines as it was done with the horizontal vanishing point identification. A set of data points among the data points having a confidence level above a predetermined threshold are grouped into a priority sample array. Further, the data points in the priority sample array are clustered into a number of sample groups. In one embodiment, each of sample group comprises two or more data points. Further, a group confidence value may be assigned to each sample group on the basis of the confidence level assigned to each data point in the sample group. The sample groups of data points may be iteratively selected from the priority sample array for line fitting. In one embodiment, the iteration may be started with the sample group having the highest confidence value in the priority sample array. The line fitting for the first sample group may be performed resulting in a first fitted line. The line fitting for each further sample group may be subsequently performed resulting in further fitted lines. A set of data points which are positioned below a predetermined distance threshold from the first fitted line may be determined based on the first and further fitted lines. A first and a second vertical vanishing point candidate may be estimated from the vertical lines corresponding to the determined set of data points. In one embodiment, the first and second horizontal vanishing point candidates may be estimated using different approximation methods, such as, a least squares method, a weighted least squares method and/or an adaptive least squares method. Other approximation methods may also be used. The proximity of each vertical vanishing point candidate may be compared to the resulting vertical text direction after projective correction. The vertical vanishing point candidate may be selected which is closest to the vertical text direction of the image document after projective correction.

If the number of detected margin lines is relatively small (less than 5, for example), it is also possible to calculate the vanishing point directly using weighted vertical vanishing point identification method. With this method, each of said estimated vertical margin lines are transformed from the Cartesian coordinate system to a data point in a homogenous coordinate system. A confidence level to each of the data points may be assigned as mentioned above. After that, weighted least square method may be used to fit the line that corresponds to the vertical vanishing point.

Figure 5:
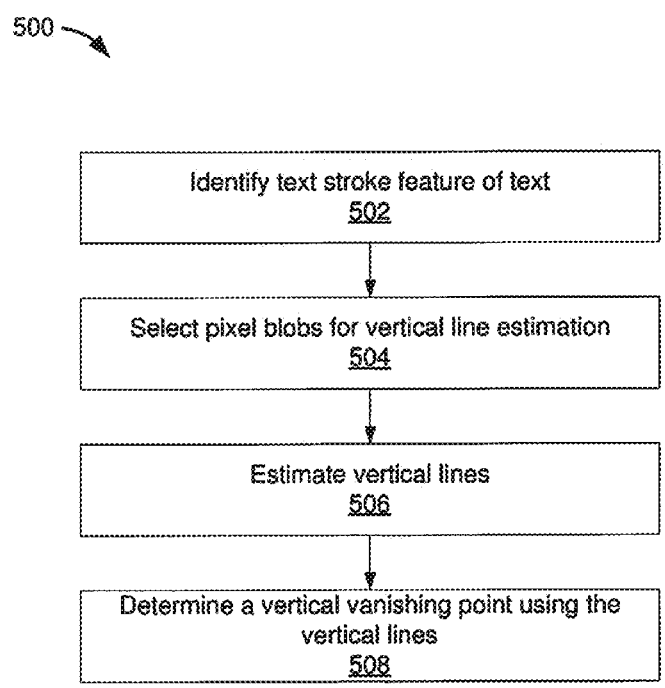
FIG. 5 shows a process flow for identifying the vertical vanishing point using text stroke features, according to an embodiment of the present disclosure.
Figure 15:
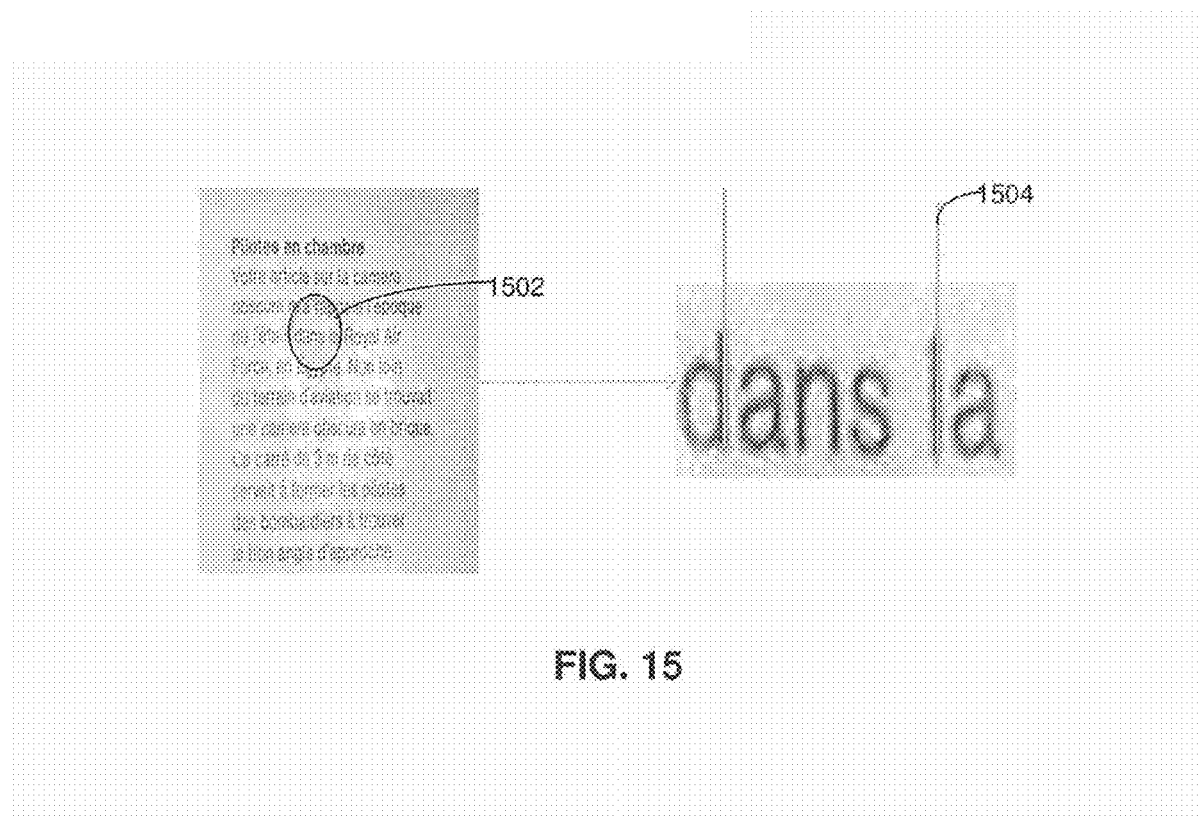
FIG. 15 shows an example image illustrating text stroke feature of a character, according to an embodiment of the present disclosure.

FIG. 5 describes an example process 500 for identifying the vertical vanishing point using the connected component analysis, according to one embodiment. The process 500 may be employed in cases where vertical margin lines may not be available due to the absence of margins. The vertical vanishing point may be identified using the text stroke features of pixel blobs, which is the building unit of text characters. In step 502, text stroke features of pixel blobs may be identified. FIG. 15 illustrates an example image showing identification of text stroke feature of a character. A portion of text identified by a circle 1502 is shown at right side of the figure. Vertical text stroke features 1504 of the letters "dans la" are identified and shown.

Figure 16:
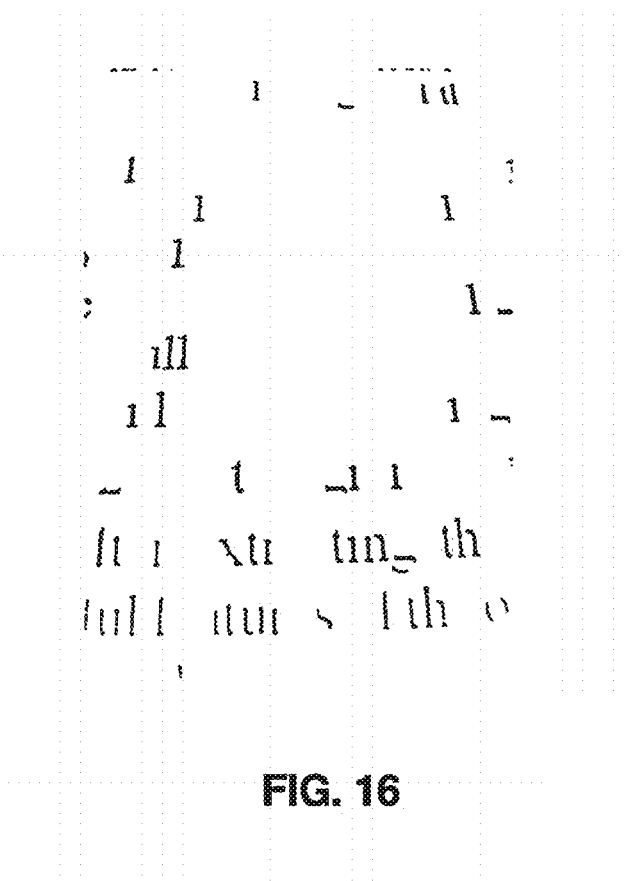
FIG. 16 shows an example image illustrating selectively extracted blobs after text stroke feature identification, according to an embodiment of the present disclosure.

In step 504, a set of pixel blobs may be identified with text stoke features complying to one or more defined criteria. In one embodiment, a pixel blob may be selected if the pixel blob fulfils one or more of the criteria: eccentricity of the pixel blob 0.97, non-proximal to margin, angle of the text stroke between 70° to 110°, and area of the pixel blob within [0.3, 5]*aream. The eccentricity may be used to denote how close to a circle shape the pixel blob is. As the eccentricity of a circle shape is zero, the smaller the eccentricity value is, the more circular the pixel blob would be. If a pixel blob's eccentricity is larger than 0.97, the pixel blob may be a distorted blob that looks like a line segment and hence can indicate the vertical distortion. In one embodiment, the pixel blob's eccentricity may be found by identifying the surrounding ellipse around the pixel blob and then calculate it according to the following formula:

$$e = \sqrt{1 - \frac{a^2}{b^2}} \quad [11]$$

where a and b represent the semi-major and semi-minor of the ellipse. For languages such as Chinese and Russian an optional preprocessing procedure such as edge detection or mathematical morphology filtering may be used to enhance pixel blob's eccentricity features. The pixel blobs having 0.97 may be filtered using an appropriate filter. The pixel blob proximal to the border of the image may not be used for estimation. In one embodiment, proximity filtering may be used to eliminate pixel blobs that have intersections with the image borders. Similarly, in one embodiment, angle filtering may be performed to filter the pixel blobs having text strokes not within 70 degree and 110 degree. The pixel blobs having area in the range of [0.3, 5]*aream may be chosen. To identify the blobs within such range, a robust method may be used to estimate median areas of the pixel blobs that are selected after filtering of abovementioned criteria. Pixel blobs whose area values are in the range of [0.3, 5]*aream are used for vertical vanishing point estimation. FIG. 16 illustrates an example image showing selectively extracted blobs after text stroke feature identification.

Figure 17:
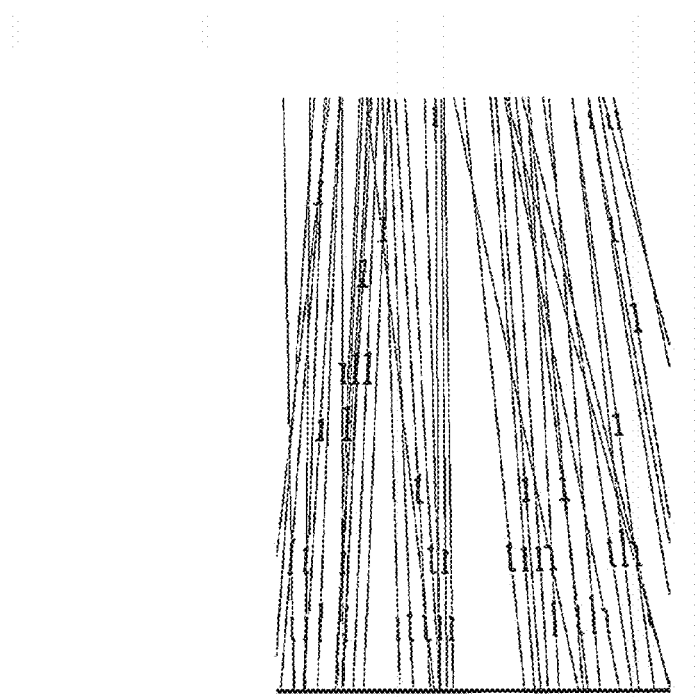
FIG. 17 shows an example image showing estimated vertical text blob lines for the selected pixel blobs, according to an embodiment of the present disclosure.

The selected pixel blobs are used for estimating vertical text blob lines. The vertical lines are estimated in step 506. The vertical lines are estimated using a line function that may correspond to the direction of the pixel blob. FIG. 17 illustrates an example image showing estimated vertical text blob lines for the selected pixel blobs.

Figure 18:
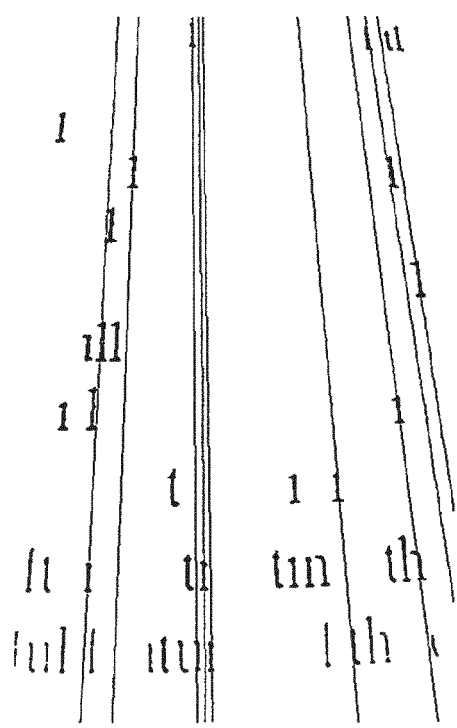
FIG. 18 shows an example image showing vertical text blob lines that are selected for vertical vanishing point, according to an embodiment of the present disclosure.

In step 508, using the vertical lines, the vertical vanishing point may be determined. In one embodiment, the vertical vanishing point may be determined using the modified RANSAC algorithm as described before. FIG. 18 illustrates an example image showing vertical text blob lines selected as a result of application of modified RANSAC algorithm. For the sake of brevity, brief explanation summarizing the application of the modified RANSAC on the vertical lines is provided below. Each of the said estimated vertical text blob lines are defined as lines in a Cartesian coordinate system. Further each of said vertical text blob lines estimated are transformed in the Cartesian coordinate system to a data point in a homogenous coordinate system. A confidence level to each of the data points may be assigned. The confidence level may be based on at least the eccentricity of the shape of the pixel blob used to estimate the respective vertical text blob line. Further, the modified RANSAC method is applied as described above in connection with the above figures to determine the vertical vanishing point.

The projective correction algorithm may be implemented as a set of computer related instructions that when loaded onto a computing device produces a machine, for implementing the functions described herein. These computer program instructions may also be stored in a non-transient computer-readable memory that can direct a computer or other programmable data processing apparatus to function in a manner described. The projective correction algorithm may also be implemented as a hardware, or combination of the hardware and software that can be implemented in or in conjunction with the computer-based systems. Those skilled in art can appreciate that computer-based system includes an operating system and various support software associated with server/computer. The projective correction algorithm as described herein may be deployed by an organization and/or a third-party vendor associated with the organization.

The projective correction algorithm may be a standalone application residing on a user device, or a modular application (for example, a plugin) that can be integrated with other applications such as image processing applications, OCR applications, and the like. For example, the standalone application may reside on user devices, such as, a personal computer, a portable computer, a laptop computer, a netbook computer, a tablet computer, a smartphone, a digital still camera, a video camera, a mobile communication device, a personal digital assistant, a scanner, a multi-function device, or any device capable of obtaining the document images and having a processor for performing operations described herein. In another contemplated implementation, a portion of the projective correction algorithm may be performed by a user device (for example, the user's camera) and the other portion of the projective correction algorithm may be performed by a processing device (for example, the user's personal computer) coupled to the user device. In this case, the processing device may perform more computationally expensive tasks. The projective correction algorithm may also be implemented as a server-based application residing on a server (for example, an OCR server) accessible from the user devices through a network. The projective correction algorithm may also be implemented as network-based application having modules implemented across multiple networked devices.

To summarize, this disclosure provides various embodiments of methods for projective correction of perspective distorted images, for example camera-based document images, which have at least one of the following technical contributions:

Use of eigenpoints to estimate the horizontal vanishing point. In general it is preferred to use one of the pixels on the baseline of the bounding box as position determining pixels, since these baselines are mostly aligned for multiple successive characters in a text portion. Among these, the eigenpoints are preferred since they are a by-product of standard connected component analysis and therefore no additional processing steps are needed to obtain these for each pixel blob.

An eigenpoints selection procedure is proposed to select eigenpoints that can be used for text line estimation. Embodiments have been disclosed which eliminate confusing eigenpoints and group the remaining eigenpoints by clustering or merging. Further, the result of the clustering of the eigenpoints is already the estimated baseline.

Left end point and right end point of the baselines of the text portion are used as margin feature points for margin line estimation. A left and right end points clustering algorithm is proposed to estimate the margin lines.

An adaptation of the conventional RANSAC algorithm is proposed, that could be termed priority-RANSAC, to identify inliers in vanishing point estimation, wherein the conventional algorithm is improved by taking into account a priori knowledge, e.g. confidence values or levels.

A vanishing point selection program is adopted to select among several candidate vanishing points that may be determined in different ways.

Weighted line estimation is proposed for horizontal vanishing point estimation using confidence levels and an adaptive weighted line estimation is proposed for vertical vanishing point estimation.

Perpendicular offset least square method and an x-y changeable weighted least square method are proposed to calculate vertical margin lines.

Vertical vanishing point estimation based on blob analysis is proposed, in particular by considering vertical stroke features of pixel blobs.

Page analysis is incorporated in the processing chain and only textual information is used for projective correction. Embodiments are proposed in which steps are taken to eliminate or separate pictures before performing the projective correction.

A complete processing chain to solve the projective correction problem is proposed, wherein the need for user intervention can be avoided.

A projective correction method is proposed which comprises elimination steps on different levels, namely eigenpoint, baseline and vanishing point candidate, to collectively improve the results of the projective correction.

The invention claimed is:

1. A method for projective correction of an image containing at least one text portion that is distorted by perspective, the method comprising the steps of:
   image binarization, wherein said image is binarized;
   connected component analysis, wherein pixel blobs are detected in said at least one text portion of said binarized image and wherein for each of said pixel blobs a position determining pixel is selected on a pixel blob baseline of the pixel blob, said position determining pixel defining the position of the pixel blob in the binarized image;
   horizontal vanishing point determination, comprising the steps of: estimating text baselines by means of said position determining pixels of said pixel blobs, identifying horizontal vanishing point candidates from said estimated text baselines, and determining a horizontal vanishing point of said at least one text portion by means of said horizontal vanishing point candidates;
   vertical vanishing point determination, wherein a vertical vanishing point is determined for said at least one text portion on the basis of vertical features thereof;
   and projective correction, wherein said perspective in said image is corrected on the basis of said horizontal and vertical vanishing points;
   wherein said horizontal vanishing point determination comprises a first elimination step on the level of said position determining pixels, a second elimination step on the level of text baselines and a third elimination step on the level of horizontal vanishing point candidates.

2. The method according to claim 1, wherein said position determining pixels are eigenpoints of said pixel blobs.

3. The method according to claim 2, wherein the first elimination step comprises the step of detecting confusing eigenpoints which are out of line with respect to eigenpoints in the vicinity of the eigenpoint in consideration and wherein said confusing eigenpoints are disregarded for said text baseline estimation.

4. Method according to claim 3, wherein said confusing eigenpoints are detected by means of the following steps:
   determining the width and height of the pixel blobs;
   determining mean values for width and height of the pixel blobs;
   and detecting said confusing eigenpoints as eigenpoints belonging to pixel blobs of which at least one of the width and height of the pixel blob in consideration differs by a predetermined extent from said calculated mean values.

5. Method according to claim 2, wherein said step of estimating text baselines comprises a step of clustering eigenpoints into eigenpoint groups, wherein said eigenpoint groups fulfil at least one of the following conditions:
   a point to point distance between the eigenpoints of the group is below a first distance threshold,
   a point to line distance between each eigenpoint of the group and a line formed by the eigenpoints of the group is below a second distance threshold,
   an off horizontal angle of the line formed by the eigenpoints of the group is below a maximum angle, and
   the eigenpoint group contains a minimum number of eigenpoints;
   and wherein said text baselines are estimated based on said eigenpoint groups.

6. Method according to claim 5, wherein said first distance threshold, said second distance threshold, said maximum angle and said minimum number of eigenpoints are set adaptively based on content of the image.

7. Method according to claim 5, wherein said step of estimating text baselines further comprises a step of eigenpoint group merging wherein eigenpoint groups on both sides of a disregarded eigenpoint are merged into a larger eigenpoint group.

8. Method according to claim 1, wherein the second elimination step comprises the steps of:
   assigning confidence levels to said text baselines, and
   eliminating text baselines on the basis of said confidence levels.

9. Method according to claim 8, wherein said confidence levels are determined on the basis of at least the length of the respective text baseline and the proximity of the group of eigenpoints used for estimating the text baseline and the resulting text baseline.

10. Method according to claim 8, wherein said elimination of text baselines is performed by means of a RANSAC algorithm in which said confidence levels are taken into account.

11. Method according to claim 1, wherein the third elimination step comprises:
   performing projective correction on the basis of each identified horizontal vanishing point candidate;
   comparing the proximity of each horizontal vanishing point candidate to the resulting horizontal text direction after projective correction; and
   selecting the horizontal vanishing point candidate which is closest to the horizontal text direction of the image document after projective correction.

12. Method according to claim 1, wherein a first and a second horizontal vanishing point candidate are estimated from said text baselines after said second elimination step and wherein for said estimation of said first and second horizontal vanishing point candidates different approximation methods are used, chosen from the group consisting of: a least squares method, a weighted least squares method and an adaptive least squares method.

13. The method according to claim 1, wherein a step of text and picture separation is performed after said image binarization and before said connected component analyses, and only textual information is kept in said binarized image.

14. A system for projective correction of an image containing at least one text portion that is distorted by perspective, the system comprising at least one processor and an associated storage containing a program executable by means of said at least one processor and comprising:
  first software code portions configured for image binarization, which when executed binarize said image;
  second software code portions configured for connected component analysis, which when executed detect pixel blobs in said at least one text portion of said binarized image and wherein for each of said pixel blobs a position determining pixel is selected on a pixel blob baseline of the pixel blob, said position determining pixel defining the position of the pixel blob in the binarized image;
  third software code portions configured for horizontal vanishing point determination, which when executed perform the steps of: estimating text baselines by means of said position determining pixels of said pixel blobs, identifying horizontal vanishing point candidates from said estimated text baselines, and determining a horizontal vanishing point of said at least one text portion by means of said horizontal vanishing point candidates;
  fourth software code portions configured for vertical vanishing point determination, which when executed determine a vertical vanishing point for said at least one text portion on the basis of vertical features thereof;
  and fifth software code portions for projective correction, which when executed correct said perspective in said image on the basis of said horizontal and vertical vanishing points;
  wherein said third software code portions when executed perform a first elimination step on the level of said position determining pixels, a second elimination step on the level of text baselines and a third elimination step on the level of horizontal vanishing point candidates.

15. The system of claim 14, comprising one of the following: a personal computer, a portable computer, a laptop computer, a netbook computer, a tablet computer, a smartphone, a digital still camera, a video camera, a mobile communication device, a personal digital assistant, a scanner, a multi-function device.

16. A non-transient storage medium on which a computer program product is stored comprising software code portions in a format executable on a computer device and configured for performing the following steps when executed on said computer device:
  image binarization, wherein said image is binarized;
  connected component analysis, wherein pixel blobs are detected in said at least one text portion of said binarized image and wherein for each of said pixel blobs a position determining pixel is selected on a pixel blob baseline of the pixel blob, said position determining pixel defining the position of the pixel blob in the binarized image;
  horizontal vanishing point determination, comprising the steps of: estimating text baselines by means of said position determining pixels of said pixel blobs, identifying horizontal vanishing point candidates from said estimated text baselines, and determining a horizontal vanishing point of said at least one text portion by means of said horizontal vanishing point candidates;
  vertical vanishing point determination, wherein a vertical vanishing point is determined for said at least one text portion on the basis of vertical features thereof;
  and projective correction, wherein said perspective in said image is corrected on the basis of said horizontal and vertical vanishing points;
  wherein said horizontal vanishing point determination comprises a first elimination step on the level of said position determining pixels, a second elimination step on the level of text baselines and a third elimination step on the level of horizontal vanishing point candidates.

* * * * *